United States Patent
Sweeney et al.

(10) Patent No.: US 11,712,822 B2
(45) Date of Patent: Aug. 1, 2023

(54) MICROWAVE-INDUCED LOCALIZED HEATING OF CNT FILLED POLYMER COMPOSITES FOR ENHANCED INTER-BEAD DIFFUSIVE BONDING OF FUSED FILAMENT FABRICATED PART

(71) Applicant: TEXAS TECH UNIVERSITY SYSTEM, Lubbock, TX (US)

(72) Inventors: Charles B. Sweeney, Lubbock, TX (US); Micah J. Green, College Station, TX (US); Mohammad Saed, Lubbock, TX (US)

(73) Assignee: Texas Tech University System, Lubbock, TX (US)

(*) Notice: Subject to any disclaimer, the term of this patent is extended or adjusted under 35 U.S.C. 154(b) by 0 days.

(21) Appl. No.: 16/517,419

(22) Filed: Jul. 19, 2019

(65) Prior Publication Data
US 2020/0009850 A1 Jan. 9, 2020

Related U.S. Application Data

(63) Continuation of application No. 15/108,217, filed as application No. PCT/US2014/072441 on Dec. 26, 2014, now Pat. No. 10,414,147.
(Continued)

(51) Int. Cl.
*B33Y 10/00* (2015.01)
*B29C 35/08* (2006.01)
(Continued)

(52) U.S. Cl.
CPC .......... *B29C 35/0805* (2013.01); *B29B 15/14* (2013.01); *B29C 64/106* (2017.08);
(Continued)

(58) Field of Classification Search
CPC ......... B33Y 70/00; B33Y 70/10; B33Y 80/00; B33Y 10/00; B33Y 30/00; B33Y 70/01;
(Continued)

(56) References Cited

U.S. PATENT DOCUMENTS

| | | |
|---|---|---|
| 5,338,611 A | 8/1994 | Lause et al. |
| 7,754,054 B2 | 7/2010 | Mitra et al. |

(Continued)

FOREIGN PATENT DOCUMENTS

| | | |
|---|---|---|
| CA | 2835545 A1 | 11/2012 |
| CA | 2935221 C | 10/2022 |

(Continued)

OTHER PUBLICATIONS

Li et al., "Carbon nanotube induced polymer crystallization: The formation of nanohybrid shish-kebabs," published Feb. 2009 (Year: 2009).*

(Continued)

*Primary Examiner* — Matthew D Matzek
(74) *Attorney, Agent, or Firm* — Dickinson Wright PLLC; Ross Spencer Garsson

(57) ABSTRACT

A microwave-induced heating of CNT filled (or coated) polymer composites for enhancing inter-bead diffusive bonding of fused filament fabricated parts. The technique incorporates microwave absorbing nanomaterials (carbon nanotubes (CNTs)) onto the surface or throughout the volume of 3D printer polymer filament to increase the inter-bead bond strength following a post microwave irradiation treatment and/or in-situ focused microwave beam during printing. The overall strength of the final 3D printed part will be dramatically increased and the isotropic mechanical properties of fused filament part will approach or exceed conventionally manufactured counterparts.

17 Claims, 31 Drawing Sheets

Related U.S. Application Data

(60) Provisional application No. 61/920,937, filed on Dec. 26, 2013.

(51) Int. Cl.
  *B29C 64/129* (2017.01)
  *B29C 64/118* (2017.01)
  *B29C 64/124* (2017.01)
  *B29C 64/106* (2017.01)
  *B29C 64/264* (2017.01)
  *D01F 11/04* (2006.01)
  *B33Y 70/10* (2020.01)
  *B33Y 30/00* (2015.01)
  *B33Y 80/00* (2015.01)
  *B29B 15/14* (2006.01)
  *B29C 70/38* (2006.01)
  *B82Y 30/00* (2011.01)
  *D01F 1/09* (2006.01)
  *B29K 105/16* (2006.01)

(52) U.S. Cl.
  CPC .......... *B29C 64/118* (2017.08); *B29C 64/124* (2017.08); *B29C 64/129* (2017.08); *B29C 64/264* (2017.08); *B33Y 10/00* (2014.12); *B33Y 30/00* (2014.12); *B33Y 70/10* (2020.01); *B33Y 80/00* (2014.12); *D01F 11/04* (2013.01); *B29C 70/38* (2013.01); *B29C 2035/0855* (2013.01); *B29K 2105/167* (2013.01); *B32B 2264/108* (2013.01); *B32B 2264/301* (2020.08); *B32B 2307/202* (2013.01); *B82Y 30/00* (2013.01); *D01F 1/09* (2013.01); *Y10T 428/29* (2015.01); *Y10T 428/2913* (2015.01); *Y10T 428/2924* (2015.01)

(58) Field of Classification Search
  CPC ......... Y10T 428/2924; Y10T 428/2929; Y10T 428/2913; B82Y 30/00; D01F 11/04; B29C 70/38; B29C 2035/0855; B29K 2105/167; B32B 2264/108
  USPC .......... 977/734, 735, 742–753, 762; 428/373
  See application file for complete search history.

(56) References Cited

U.S. PATENT DOCUMENTS

| | | | |
|---|---|---|---|
| 8,080,199 | B2 | 12/2011 | Tour et al. |
| 8,801,990 | B2 | 8/2014 | Mikulak et al. |
| 8,920,697 | B2 | 12/2014 | Mikulak et al. |
| 10,414,147 | B2 | 9/2019 | Sweeney et al. |
| 2009/0101278 | A1* | 4/2009 | Laberge-Lebel ...... B29C 64/106 427/508 |
| 2011/0031433 | A1 | 2/2011 | Burchell |
| 2011/0117268 | A1 | 5/2011 | Batchelder |
| 2011/0163480 | A1 | 7/2011 | Herkner |
| 2011/0223343 | A1 | 9/2011 | Wang et al. |
| 2012/0016053 | A1 | 1/2012 | Riebel |
| 2012/0077398 | A1* | 3/2012 | Gaillard ................ B29B 15/125 442/59 |
| 2012/0231225 | A1* | 9/2012 | Mikulak ................... D01F 8/12 428/172 |
| 2014/0079841 | A1 | 3/2014 | Pridoehl et al. |
| 2014/0134335 | A1 | 5/2014 | Pridoehl et al. |
| 2015/0321424 | A1 | 11/2015 | Pridoehl et al. |
| 2016/0136887 | A1 | 5/2016 | Guillemette et al. |
| 2016/0325491 | A1 | 11/2016 | Sweeney et al. |
| 2020/0009850 | A1 | 1/2020 | Sweeney et al. |

FOREIGN PATENT DOCUMENTS

| | | |
|---|---|---|
| EP | 2676784 A1 | 12/2013 |
| FR | 2918081 | 6/2007 |
| JP | 2003509244 A | 11/2003 |
| JP | 2007533109 A1 | 11/2007 |
| JP | 2011064986 A | 3/2011 |
| JP | 6563953 B2 | 8/2019 |
| JP | 7031878 B2 | 2/2022 |
| KR | 20100033600 A * | 3/2010 .............. D01D 5/30 |
| KR | 102327600 B1 | 11/2021 |
| KR | 102437634 B1 | 8/2022 |
| WO | 2001020534 A1 | 3/2001 |
| WO | 2005117030 A2 | 12/2005 |
| WO | 2006114737 A1 | 11/2006 |
| WO | 2011108669 A1 | 9/2011 |
| WO | 2012152511 A1 | 11/2012 |
| WO | 2012164015 A1 | 12/2012 |
| WO | 2014072148 A1 | 5/2014 |
| WO | 2015130401 A2 | 9/2015 |

OTHER PUBLICATIONS

Chowdhury, S., et al., "Microwave-Induced Rapid Nanocomposite Synthesis Using Dispersed Single-Wall Carbon Nanotubes as the Nuclei," Journal of Materials Science, 2009, 44, (5), 1245-1250, doi: 10.1007 /s 10853-009-3259-4; 6 pages.

Higginbotham, A., et al., "Carbon Nanotube Composite Curing through Absorption of Microwave Radiation," Composites Science and Technology, 2008, 68, (15-16), 3087-3092, doi: 10.1016/j.compscitech.2008.07.004; 7 pages.

Hochstetter FR2918081 Jun. 2007 eng mach trans (Year: 2007).

Irin, F., et al., "Detection of carbon nanotubes in biological samples through microwave-induced heating," Carbon, 2012, 50, (12), 4441-4449; 9 pages.

Nikzad, M., et al., "Thermo-Mechanical Properties of a Highly Filled Polymeric Composites for Fused Deposition Modeling," Materials Design, 2011, 32, (6), 3448-3456, doi: 10.1016/j.matdes.2011.01.056; 9 pages.

Partain, S.C., "Fused Deposition Modeling with Localized Pre-Deposition Heating Using Forced Air," Vasa, http://medcontent.metapress.com/index/ A65RM03P487 4243N. pdf; University, 2007, http://scholarworks.montana.edu/xmlui/handle/1/2016.; 11 pages.

Paton, K., et al., "Efficient Microwave Energy Absorption by Carbon Nanotubes," Carbon, 2008, 46, (14), 1935-1941, doi:10.1016/j.carbon.2008.08.001; 7 pages.

Shim, H., et al., "Enhancement of Adhesion Between Carbon Nanotubes and Polymer Substrates Using Microwave Irradiation," Scripta Materialia, 2009, 61, (1), 32-35, doi:10.1016/j.scriptamat.2009.02.060; 4 pages.

Shofner, M., "Nanofiber-reinforced Polymers Prepared by Fused Deposition Modeling", Journal of Applied Polymer Science, 2003, 89, (11), 3081-3090 http://onlinelibrary.wiley.com/doi/10.1002/app.12496/full. 10 pages.

Vegesna, S., et al., "Non-destructive Technique for Broadband Characterization of Carbon Nanotubes at Microwave Frequencies," Journal of Electromagnetic Waves and Applications, 2013, 27, (11), 1372-1381; 11 pages.

Wang, C., et al., "Flexible Field Emitter Made of Carbon Nanotubes Microwave Welded onto Polymer Substrates," Applied Physics Letters, 2007, 90, (10), 103111, doi: 10.1063/1.2711771; 4 pages.

Wang, C., et al., "Strong Carbon-Nanotube-Polymer Bonding by Microwave Irradiation," Advanced Functional Materials, 2007, 17, (12), 1979-1983, doi: 10.1002/adfm.200601011; 5 pages.

Ziemian, C., et al., "Anisotropic Mechanical Properties of ABS Parts Fabricated by Fused Deposition Modelling" Mechanical Engineering, 2012, Chapter 7, 159-181 (edited by Gokcek, Murat), doi: 10.5772/34233; 24 pages.

Notification of Reasons for Rejection; JP Pal. App. No. 2019-136237; dated Nov. 4, 2020; 3 pages translation; 2 pages original language.

Notification of Reasons for Rejection; JP Pal. App. No. 2016-561989; dated Feb. 26, 2019; 3 pages translation; 3 pages original language.

Korean Office Action; Notice to File a Response; KO Pat. App. No. 10-2016-7020477; dated Jan. 2, 2021; 9 pages original language; 9 pages translation.

(56) References Cited

OTHER PUBLICATIONS

Patent Cooperation Treaty, International Preliminary Report on Patentability for PCT/US2014/0721441 dated Jun. 28, 2016, 10 pages.
Patent Cooperation Treaty, International Search Report and Written Opinion for PCT/US2014/0721441 dated Dec. 26, 2014, 14 pages.
Canadian Intellectual Property Office, Office Action for Canadian Patent App. No. 2,935,221; dated Jul. 9, 2021; 6 pages.
Korean Intellectual Property Office, Notice to File a Response for Korean Application No. 10-2021-7036820, dated Feb. 21, 2022; 2 pages translation; 3 pages original language.
Japanese Office Action; Notification of Reasons for Rejection; JA Pat. App. No. 2021-185493; dated Aug. 22, 2022; 2 pages original language; 3 pages translation.

* cited by examiner

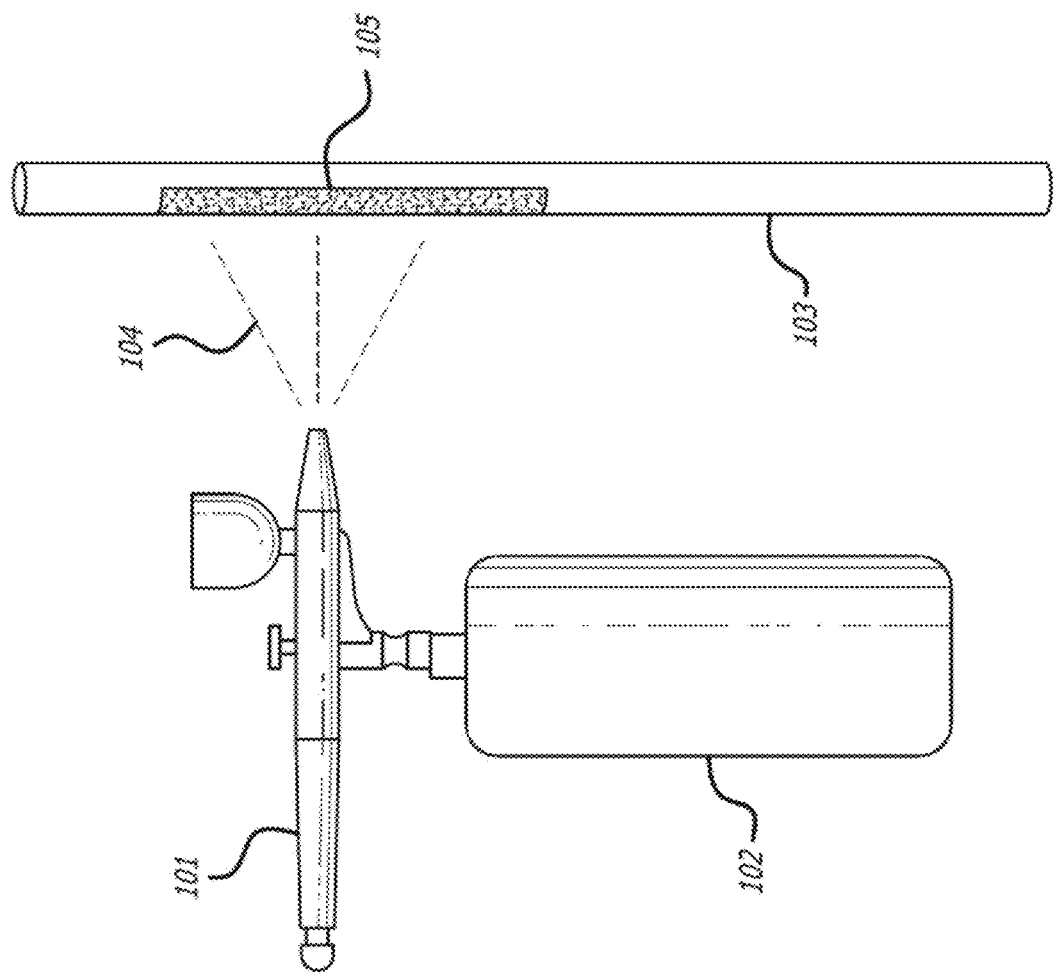

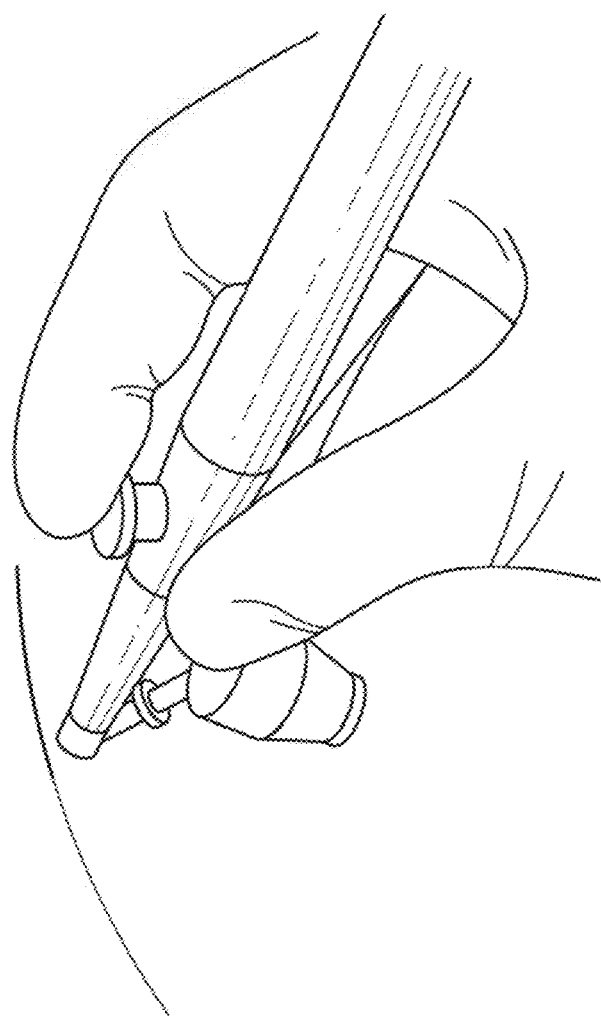

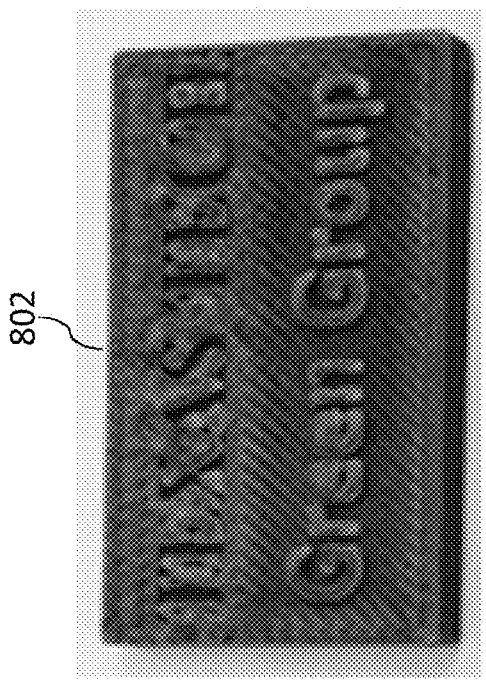
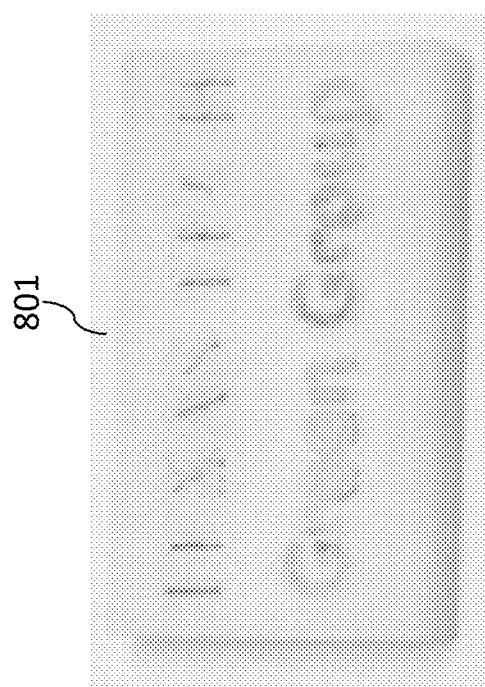
FIG. 8

FIG. 20A
FIG. 20B
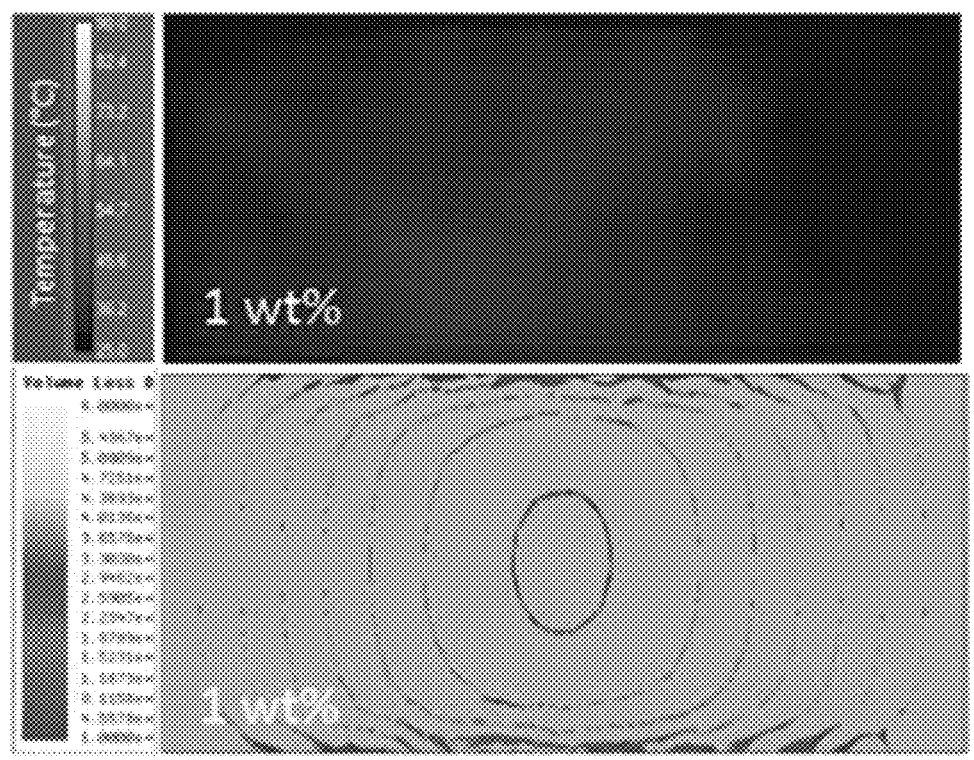
FIG. 20C

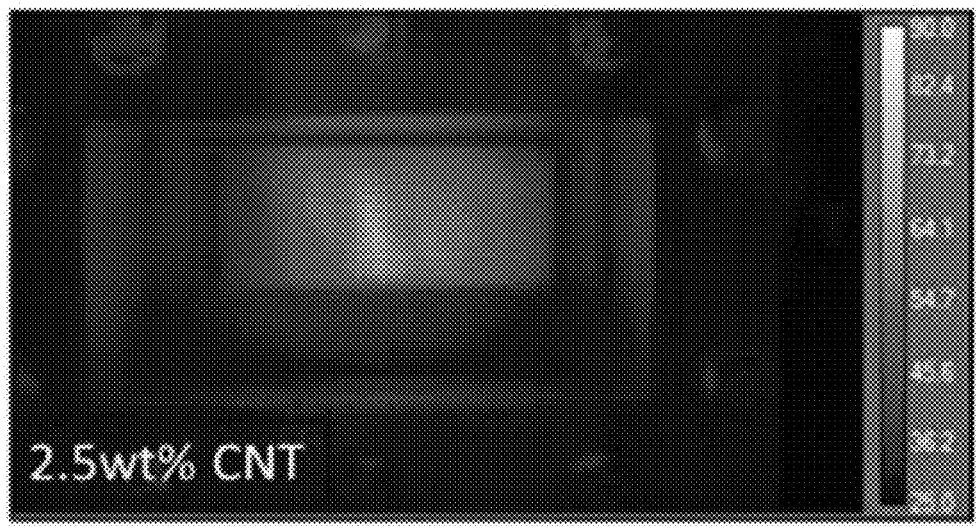
FIG. 21A
FIG. 21B
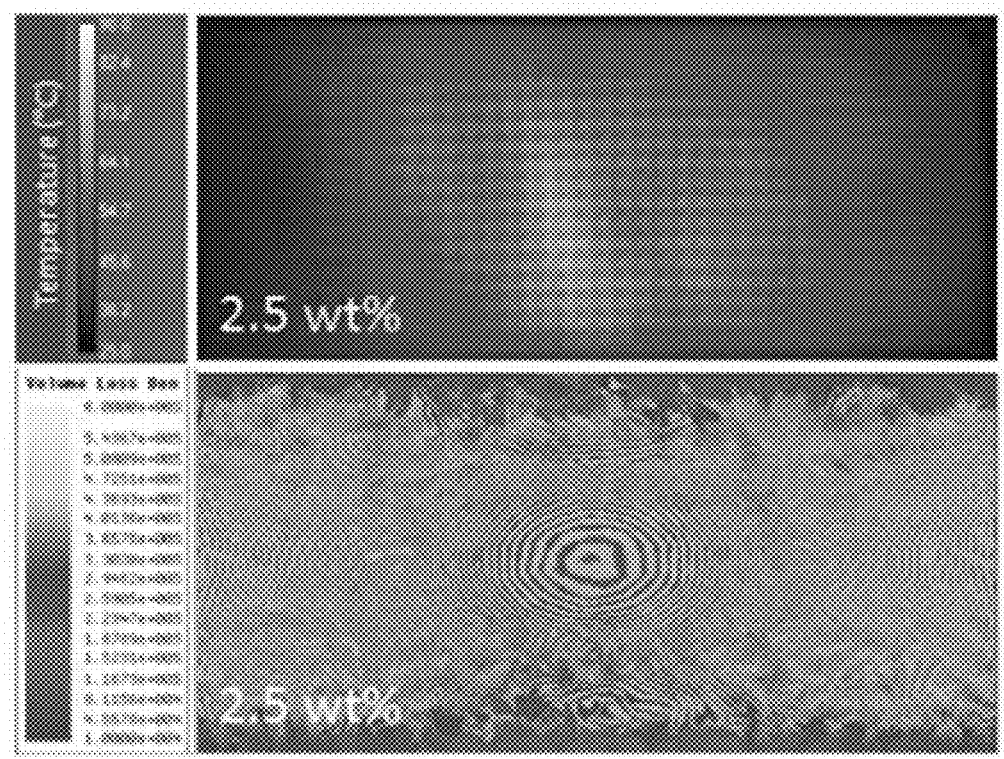
FIG. 21C

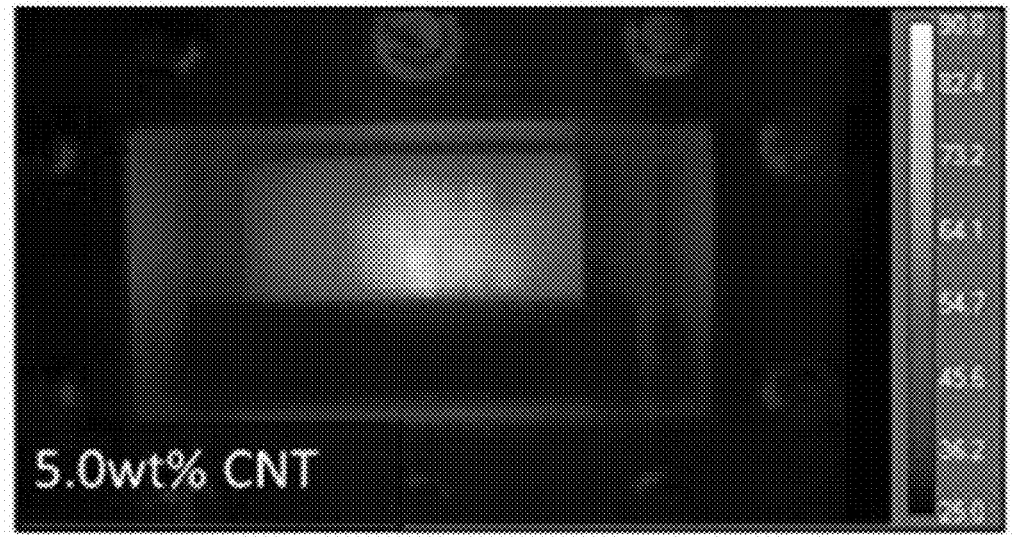
FIG. 22A
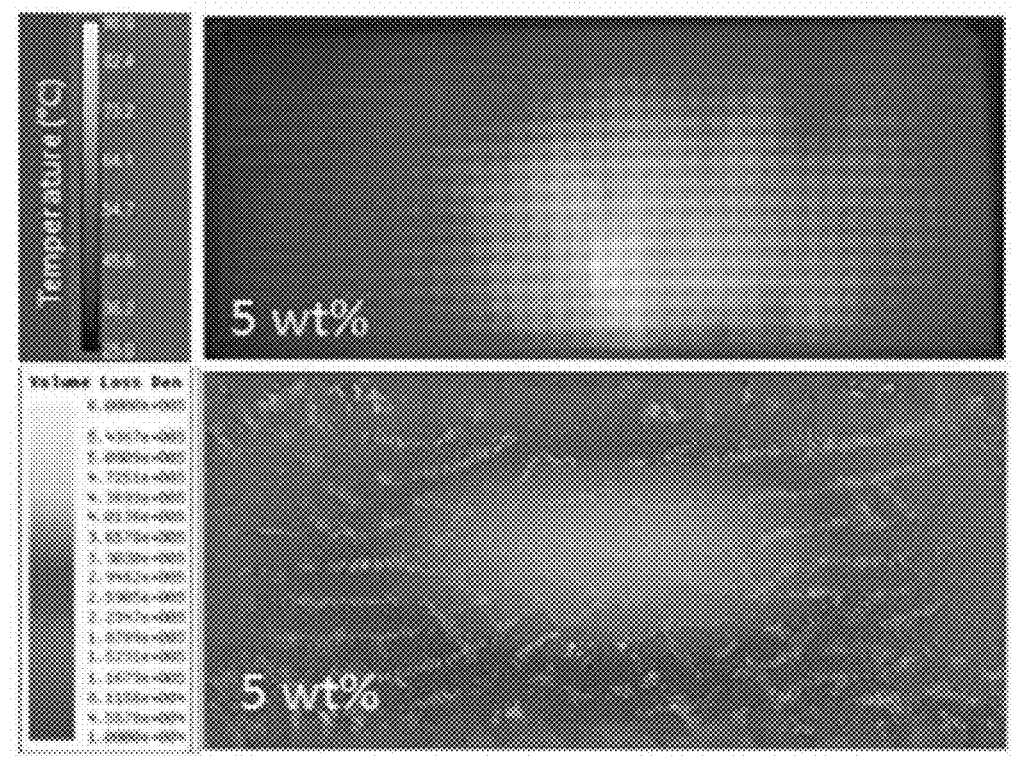
FIG. 22B
FIG. 22C

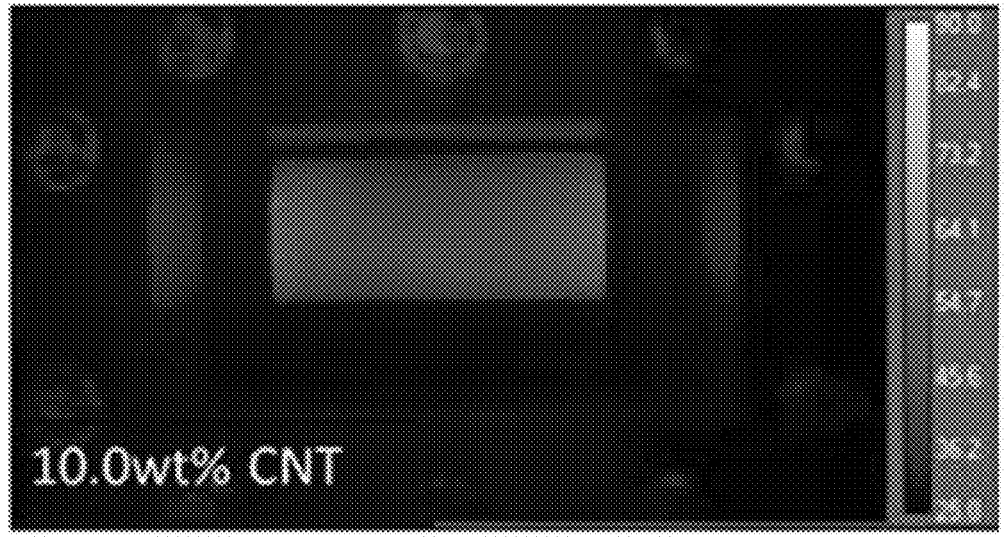
FIG. 23A
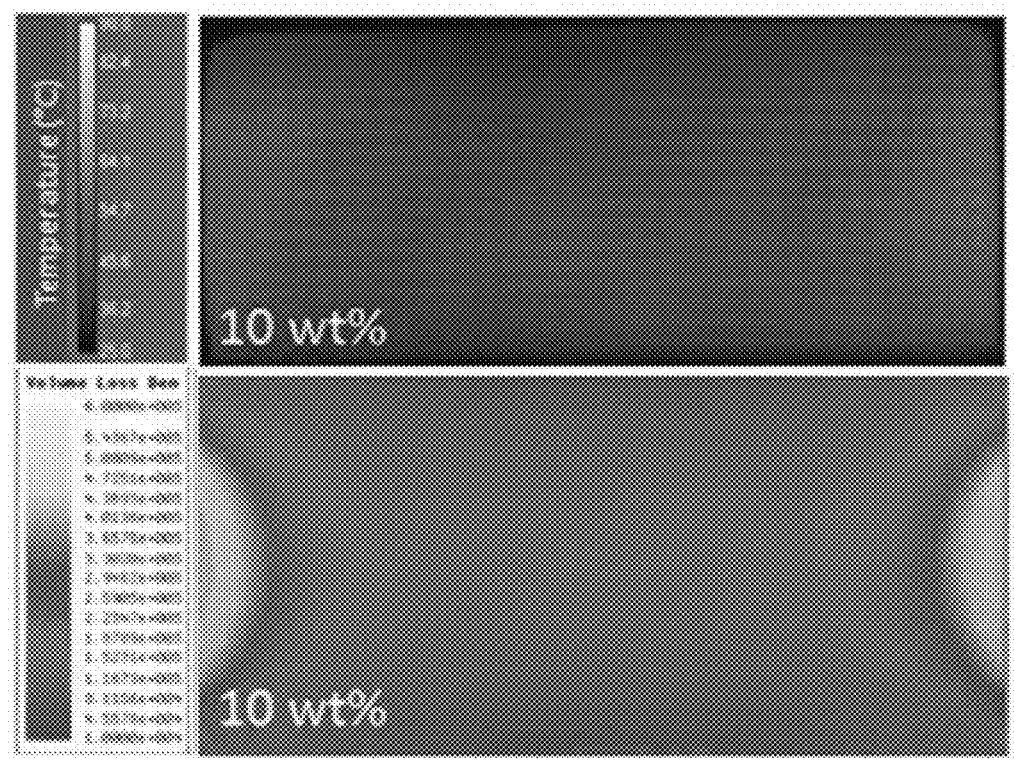
FIG. 23B
FIG. 23C

MICROWAVE-INDUCED LOCALIZED HEATING OF CNT FILLED POLYMER COMPOSITES FOR ENHANCED INTER-BEAD DIFFUSIVE BONDING OF FUSED FILAMENT FABRICATED PART

CROSS-REFERENCE TO RELATED PATENT APPLICATIONS

This Application is a continuation application of U.S. patent application Ser. No. 15/108,217, filed on Jun. 24, 2016 entitled "Microwave-Induced Localized Heating Of CNT Filled Polymer Composites For Enhanced Inter-Bead Diffusive Bonding Of Fused Filament Fabricated Parts," which is the 35 U.S.C. § 371 National Application of International Patent Application No. PCT/US2014/072441, filed Dec. 26, 2014 entitled "Microwave-Induced Localized Heating Of CNT Filled Polymer Composites For Enhanced Inter-Bead Diffusive Bonding Of Fused Filament Fabricated Parts," which designated the United States and claimed priority to U.S. Patent Provisional Appl. Ser. No. 61/920,937, filed Dec. 26, 2013, entitled "Microwave-Induced Localized Heating Of CNT Filled Polymer Composites For Enhanced Inter-Bead Diffusive Bonding Of Fused Filament Fabricated Parts." The foregoing patent applications are commonly assigned to the Assignee of the present Application and are hereby incorporated herein by reference in their entirety for all purposes.

GOVERNMENT INTEREST

This invention was made with government support under Grant No. Texas Tech University: CBET-1133250, NSF CBET NanoEHS, "Carbon nanotube detection in plants through microwave-induced heating." The government has certain rights in the invention.

FIELD OF INVENTION

The present disclosure relates generally to microwave-induced heating of CNT filled (or coated) polymer composites for enhancing inter-bead diffusive bonding of fused filament fabricated parts. The present invention embodies a technique for incorporating microwave absorbing nanomaterials (carbon nanotubes (CNTs)) onto the surface (or throughout the volume) of 3D printer polymer filament to increase the inter-bead bond strength following a post microwave irradiation treatment and/or in-situ focused microwave beam during printing.

BACKGROUND OF INVENTION

Additive manufacturing (AM), which is also called solid freeform fabrication (SFF) and three-dimensional (3D) printing, is a set of layer-by-layer processes for producing 3D objects directly from a digital model. The technology of additive manufacturing began a few decades ago. 3D printing technology is used for prototyping and for distributed manufacturing with applications in, for example, architecture, construction (AEC), industrial design, automotive, aerospace, military, engineering, civil engineering, dental and medical industries, biotech (human tissue replacement), fashion, footwear, jewelry, eyewear, education, geographic information systems, food, and many other fields. Currently, the additive manufacturing (3D printing) industry has grown to almost $3 billion in 2012 and is projected to grow to more than $6.5 billion by 2019. Wohlers Associates, "Wohlers Report 2012: Additive Manufacturing and 3d Printing, State of the Industry." 2012, 1-271 (Ft. Collins, Co.) http://wohlersassociates.com/state-of-the-industry-reports.html.

The origin and evolution of additive manufacturing and the National Science Foundation's role in such origin and evolution are set forth in C. L. Weber, et al., "The Role of the National Science Foundation in the Origin and Evolution of Additive Manufacturing in the United States," *IDA Science & Technology Policy Institute*, IDA Paper P-5091, 2013, which is attached hereto as Appendix A.

In general terms, additive manufacturing is a process that takes virtual blueprints from computer aided design (CAD) or animation modeling software and slices them into digital cross-sections for the machine to successively use as a guideline for printing. Depending on the machine used, material or a binding material is deposited until material/binder layering is complete and the final 3D model has been printed. When printing, the 3D printing machine reads the design and lays down successive layers of liquid, powder, paper or sheet material to build the model from a series of cross-sections. These layers are joined or automatically fused to create the final shape. The fundamental advantage of additive manufacturing techniques is their ability to create almost any shape or geometric feature.

In 3D printing machines that use an extrusion deposition process (also known as Fused Filament Fabrication (FFF)), a plastic filament (typically wound on a coil and unreeled to supply material) is used and is applied through an extrusion nozzle, which regulates the flow of the molten plastic bead by controlling the filament feed rate. The extrusion nozzle heats to melt the material (or otherwise renders the material flowable). The extrusion nozzle can be moved in both horizontal and vertical directions by a computer-controlled mechanism. Alternatively, the printer platform bed may be moved relative to the extrusion nozzle, or coordinated movements of both the nozzle and platform may be used to achieve the desired extrusion path in the x, y, and z directions. The model or part is produced by extruding small beads of thermoplastic material to form consecutive layers in the vertical (i.e., z) direction. The material hardens immediately after extrusion from the extrusion nozzle. Various polymers are used in such an extrusion deposition process, including, but not limited to, the following: acrylonitrile butadiene styrene (ABS), polycarbonate (PC), polylactic acid (PLA), high density polyethylene (HDPE), PC/ABS, and polyphenylsulfone (PPSU). Generally, the polymer is in the form of a filament, fabricated from virgin resins.

Currently, there is a disparity between traditionally manufactured polymer parts utilizing injection molding, extrusion molding, machining etc., and parts printed with additive manufacturing techniques such as Fused Deposition Modeling (FDM™) (Stratasys Inc., Minneapolis, Minn.) and Fused Filament Fabrication (FFF). Such disparity includes, for example, that the strength of the final part may be compromised when compared to parts produced through conventional machining methods. Accordingly, additive manufacturing capabilities are hindered by the weak weld between printed filaments, which often leads to delamination and mechanical failure. Thus, there is a need for a method to make an object using 3D printing that has the same or better mechanical properties as compared to those of conventionally manufactured objects (such as those objects made by injection molding, extrusion molding, machining, etc.).

SUMMARY OF INVENTION

The present disclosure relates generally to microwave-induced heating of CNT filled (or coated) polymer composites for enhancing inter-bead diffusive bonding of fused filament fabricated parts. The present invention embodies a technique for incorporating microwave absorbing nanomaterials (carbon nanotubes (CNTs)) onto the surface (or throughout the volume) of 3D printer polymer filament to increase the inter-bead bond strength following a post microwave irradiation treatment and/or in-situ focused microwave beam during printing. By the methods of the present invention, the overall strength of the final 3D printed part will be dramatically increased and the isotropic mechanical properties of fused filament part will approach or exceed conventionally manufactured counterparts. The present invention does so by applying a small weight fraction of nanomaterials to existing industry standard polymer filaments, and employing a cheap, rapid, and scalable post processing technique to greatly enhance mechanical properties.

Current technologies rely on simple extrusion of polymer beads adjacent to and/or on top of another polymer bead, and utilize the latent extrusion heat and/or with the aid of a heated printing chamber to locally fuse or weld contiguous polymer beads. This process results in incomplete welding of the beads and subsequently reduced mechanical properties due to inter-bead delamination especially in loads applied perpendicularly to the bead or "road" alignment. The invention disclosed herein relies on nanometer-scale locally induced indirect conduction based heating of polymers though microwave heating of RF absorbing nanomaterials such as CNTs. This allows for rapid diffusive bonding of polymer chains between adjacent beads, without significantly heating up and degrading or dimensionally distorting the bulk RF transparent polymer part.

In one embodiment of the present invention, an object is made using 3D printing techniques. A uniform coaxial coating is applied to encapsulate 3D printing filaments in a microwave absorbing nanomaterial (such as carbon nanotubes). The coating can occur during the 3D printing process or after the 3D printing process is complete. Alternatively, microwave absorbing nanomaterials can be incorporated either uniformly throughout the volume of the printer filament, or in a radial gradient pattern to achieve a desired cross section composition upon bead extrusion. For control of nanomaterial alignment upon extrusion, techniques to control the molten polymer flow can be implemented. This includes: modifying the nozzle die land length to achieve a steady laminar or turbulent flow regime; rotating the die or platform about the extrusion axis to induce a helical twisted flow; or controlling the motion of the printer filament relative to the extruder nozzle. The printed object is then irradiated with microwaves for a predetermined duration and power. The irradiation can occur intermittently during the 3D printing process or after the 3D printing process is complete. The irradiation heats up the microwave absorbing nanomaterial to locally subject the coated polymer filaments to extremely hot temperatures. This localized heating will weld the polymer at the interfaces.

Applications of the present invention provide a facile treatment process for improving the mechanical properties of 3D printed thermoplastic parts. Additional applications include site-specific bonding of 3D printed parts with focused microwave energy for superior control of mechanical properties and/or control of electrically conducting, semiconducting, and dielectric networks for simultaneous manufacture of embedded electronics.

For instance, the 3D printed parts can possess multifunctional properties tuned for a specific application. This includes the ability to monitor the structural integrity of a part non-destructively and in-situ by measuring changes in the bulk electrical conductivity. This also includes applications utilizing particular kinds of RF absorbing nanomaterials. Implementing a multilayer coaxial filament coating profile, consisting of a conductive nanocomposite core and dielectric sheath would enable electrically conductive extruded polymer wires for printing circuits, electromagnetic coils, inductors, and antennas. Microwave irradiation and heating of these extruded wires would enable sintering of electrically conductive nanomaterials (such as CNTs, silver nanoparticles and nanowires) to achieve the desired electrical conductivity. Additionally, including site-specific nanomaterials segmented along the length of the printer filament can enable and result in the manufacture of embedded electronics, such as strain sensors, temperature sensors, touch sensors, electroluminescent indicators, and electromechanical actuators.

In general, in one aspect, the invention features an additive manufacturing process that includes selecting a polymer filament having a coating comprising a microwave absorbing nanomaterial. The additive manufacturing process further includes fabricating a three-dimensional object from the polymer filament. The additive manufacturing process further includes irradiating the polymer filaments with microwaves during or after the step of fabricating the three-dimensional object.

Implementations of the invention can include one or more of the following features:

The microwave absorbing nanomaterial can be selected from the group consisting of carbon nanotubes, carbon black, buckyballs, graphene, superparamagnetic nanoparticles, magnetic nanoparticles, metallic nanowires, semiconducting nanowires, quantum dots, polyaniline (PANI), poly3,4-ethylenedioxythiophene polystyrenesulfonate, and combinations thereof.

The microwave absorbing nanomaterial can include carbon nanotubes.

The carbon nanotubes can be multi-walled carbon nanotubes.

The coating can have a thickness of between 0.005% and 30% of diameter of the polymer filament.

The coating can have a thickness between about 100 nm and 0.5 mm.

The coating can include between 1 wt % and 50 wt % of carbon nanotubes.

The coating can include between 3 wt % and 10 wt % of carbon nanotubes.

The polymer filament can include polylactive acid (PLA).

The polymer filament can include a filament selected from the group consisting of styrene (ABS), polycarbonate (PC), polylactic acid (PLA), polyethylene (PE), PC/ABS, polyphenylsulfone (PPSU), polyamide (nylon), polystyrene (PS), polyetherimide, polyether ether ketone (PEEK), polytetrafluoroethylene (PTFE), and combinations thereof.

The step of irradiating the polymer filaments with microwaves can occur during the step of fabricating the three-dimensional object.

The step of irradiating the polymer filaments with microwaves can occur after the step of fabricating the three-dimensional object.

The step of irradiating the polymer filaments with microwaves can expose the polymer filaments to microwaves for between 1 second and 5 minutes.

The step of irradiating the polymer filaments with microwaves can be with an irradiation power between 1 W and 1 kW.

The additive manufacturing process can further include selecting polymer filaments. The additive manufacturing process can further include coating the polymer filaments with the coating. the step of coating can be selected from the step consisting of spray deposition, dip coating, extrusion coating, and combinations thereof.

In general, in another aspect, the invention features a three-dimensional object that includes a plurality of polymer filaments. The polymer filaments in the plurality have a coating that includes a microwave absorbing nanomaterial. The three-dimensional object further includes that the coating of the polymer filaments have been fused together.

Implementations of the invention can include one or more of the following features:

The microwave absorbing nanomaterial can be selected from the group consisting of carbon nanotubes, carbon black, buckyballs, graphene, superparamagnetic nanoparticles, magnetic nanoparticles, metallic nanowires, semiconducting nanowires, quantum dots, polyaniline (PANI), poly3,4-ethylenedioxythiophene polystyrenesulfonate, and combinations thereof.

The microwave absorbing nanomaterial can include carbon nanotubes.

The carbon nanotubes can be multi-walled carbon nanotubes.

The coating can have a thickness between about 100 nm and 0.5 mm.

The coating can include between 1 wt % and 50 wt % of carbon nanotubes.

The coating can include between 3 wt % and 10 wt % of carbon nanotubes.

The polymer filament can include polylactive acid (PLA).

The polymer filament can include a filament selected from the group consisting of styrene (ABS), polycarbonate (PC), polylactic acid (PLA), polyethylene (PE), PC/ABS, polyphenylsulfone (PPSU), polyamide (nylon), polystyrene (PS), polyetherimide, polyether ether ketone (PEEK), polytetrafluoroethylene (PTFE), and combinations thereof.

In general, in another aspect, the invention features an additive manufacturing device that includes a three-dimensional printer having an extruder. The additive manufacturing device further includes a polymer filament having a coating that includes a microwave absorbing nanomaterial that can be extruded through the extruder. The additive manufacturing device further includes a microwave source operable for irradiating the polymer filament after extrusion through the extruder.

Implementations of the invention can include one or more of the following features:

The additive manufacturing device can further include a tip located near the extruder. The tip can be operable for focusing microwaves from the microwave source near the extruder.

The additive manufacturing device can further include electromagnetic shielding to shield microwaves from emitting from the device.

The microwave absorbing nanomaterial can include carbon nanotubes.

The coating can have a thickness of between 0.005% and 30% of diameter of the polymer filament.

The coating can have a thickness between about 100 nm and 0.5 mm.

The coating can include between 1 wt % and 50 wt % of carbon nanotubes.

The coating can include between 3 wt % and 10 wt % of carbon nanotubes.

The polymer filament can include polylactive acid (PLA).

The polymer filament can include a filament selected from the group consisting of styrene (ABS), polycarbonate (PC), polylactic acid (PLA), polyethylene (PE), PC/ABS, polyphenylsulfone (PPSU), polyamide (nylon), polystyrene (PS), polyetherimide, polyether ether ketone (PEEK), polytetrafluoroethylene (PTFE), and combinations thereof.

The additive manufacturing device can be operable to expose the polymer filaments with microwaves for between 1 second and 5 minutes.

The additive manufacturing device can be operable to expose the polymer filaments with microwaves with an irradiation power between 1 W and 1 kW.

BRIEF DESCRIPTION OF THE DRAWINGS

For better understanding of the present invention, and the advantages thereof, reference is now made to the following descriptions taken in conjunction with the accompanying drawings.

FIG. 1A illustrates a process for coating a polymer filament exterior with carbon nanotubes by spray deposition.

FIG. 1B is an illustration showing the spray deposition process illustrated in FIG. 1A.

FIG. 7 is an optical microscope image of the microwave-fused crosshatch stack 701.

FIG. 8 is two photographs of similarly made 3D printed objects (object 801 and object 1102). Object 801 was made by an additive manufacturing process with pure ABS printer filament. Object 1102 was made by the same additive manufacturing process with carbon nanotube coated ABS printer filament, which was treated post-printing with microwave irradiation.

FIG. 20A is an image from a FLIR camera of a PLA/multi-walled carbon nanotube samples with a loading of 1.0 wt %. FIG. 20B is enlarged view of the image of FIG. 20A.

FIG. 20C is an ANSYS simulation of volume loss density (roughly proportional to power dissipated as heat) as a function of CNT loading of 1.0 wt % in homogeneous polymer nanocomposites.

FIG. 21A is an image from a FLIR camera of a PLA/multi-walled carbon nanotube samples with a loading of 2.5 wt %. FIG. 21B is enlarged view of the image of FIG. 21A.

FIG. 21C is an ANSYS simulation of volume loss density as a function of CNT loading of 2.5 wt % in homogeneous polymer nanocomposites.

FIG. 22A is an image from a FLIR camera of a PLA/multi-walled carbon nanotube samples with a loading of 5 wt %. FIG. 22B is enlarged view of the image of FIG. 22A.

FIG. 22C is an ANSYS simulation of volume loss density as a function of CNT loading of 5 wt % in homogeneous polymer nanocomposites.

FIG. 23A is an image from a FLIR camera of a PLA/multi-walled carbon nanotube samples with a loading of 10 wt %. FIG. 23B is enlarged view of the image of FIG. 23A.

FIG. 23C is an ANSYS simulation of volume loss density as a function of CNT loading of 10 wt % in homogeneous polymer nanocomposites.

DETAILED DESCRIPTION

Figure 2:
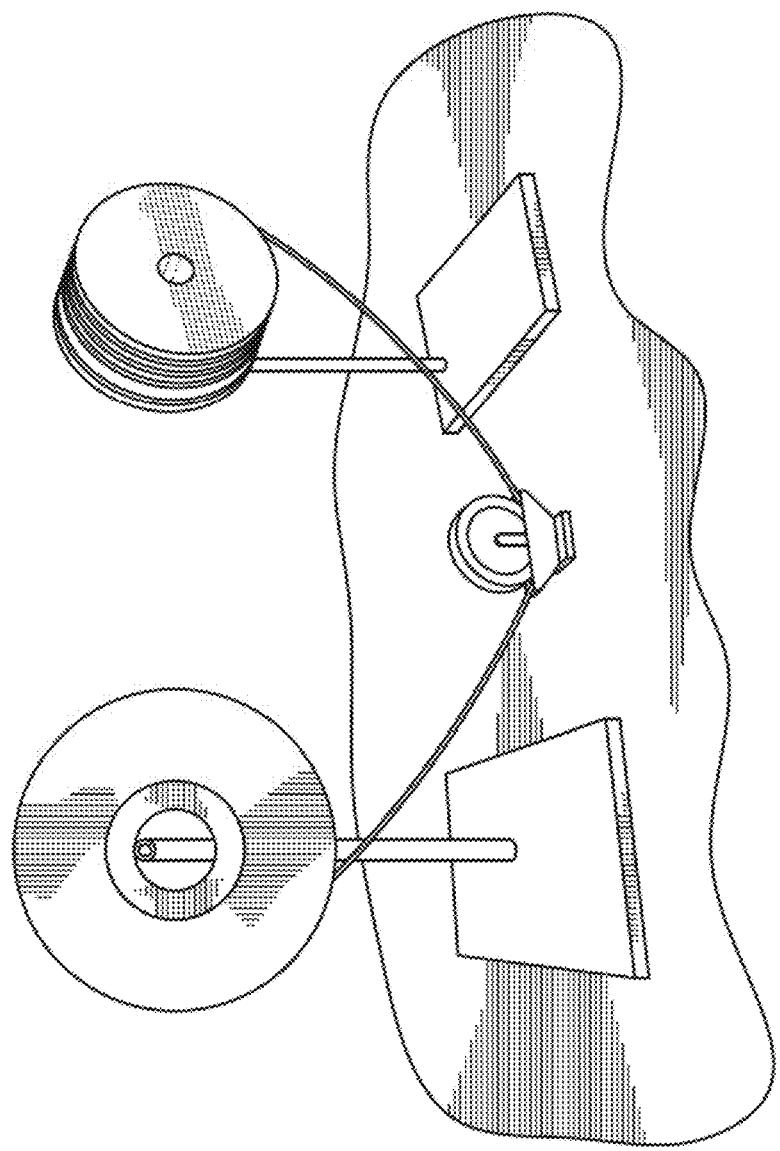
FIG. 2 is an illustration showing an alternative process for coating a polymer filament exterior with carbon nanotubes by dip coating.

The present invention embodies a technique for incorporating microwave absorbing nanomaterials (carbon nanotubes (CNTs)) onto the surface (or throughout the volume) of 3D printer polymer filament to increase the inter-bead bond strength following a post microwave irradiation treatment and/or in-situ focused microwave beam during printing. In embodiments of the present invention, additive manufacturing techniques, in which successive layers are laid down additively into the desired shape, are utilized by 3D printers to manufacture thermoplastic parts. These 3D printers can print intricate product designs much faster than regular machining techniques; however, the strength of the final part may be compromised when compared to parts produced through conventional machining methods. A treatment process of the present invention is used to address the compromise of the strength of the produced part as compared to parts produced through conventional machining methods. The treatment process is used to eradicate this weakness of 3D-printed parts. The treatment process includes coating the part with a carbon nanotube (CNT)-coating and application of microwave irradiation (often successive applications of microwave irradiation). The microwave irradiation can occur during the additive manufacturing process and/or after completion of the additive manufacturing process.

Coating Polymer Filaments

Referring to FIG. 1A, FIG. 1A illustrates a process for coating a polymer filament 103 exterior with carbon nanotubes by spray deposition. In this embodiment, an airbrush 101 that has a reservoir 102 of a carbon nanotube dispersion is used to coat the exterior of polymer filament 103, such as an acrylonitrile butadiene styrene (ABS) filament. The polymer filament 103 can be made from other polymers, such as polycarbonate (PC), polylactic acid (PLA), high density polyethylene (HDPE), PC/ABS, and polyphenylsulfone (PPSU), polyamide (nylon), high impact polystyrene (HIPS), polyetherimide (ULTEM™), polyether ether ketone (PEEK), polytetrafluoroethylene (PTFE), and combinations thereof. The carbon nanotube dispersion was made by dissolving the thermoplastic in a suitable solvent (acetone for ABS) at a concentration of 10 mg/ml and adding multi-walled carbon nanotube powder (CheapTubes.com, Brattleboro, Vt.) at a concentration of 0.5 mg/ml followed by probe sonicating for 30 minutes. Other solvents that can be used are, for example, chloroform for PLA.

Using the airbrush 101, a spray 104 of the carbon nanotube deposition is applied to polymer filament 103 to form a coating 105 upon the polymer filament 103. FIG. 1B is an illustration showing the spray deposition process illustrated in FIG. 1A.

Alternative processes to coat the exterior of polymer filament 103 with a coating 105 include dip coating the bare filament in a bath of the CNT dispersion (such as shown in FIG. 2), simultaneous co-extrusion of a CNT polymer masterbatch sheath and pure polymer core coaxial filament, and combinations thereof. See U.S. Pat. No. 3,458,615, "Hydrodynamically Centering Sheath/Core Filament Spinnerette," issued Jul. 29, 1969, to Bragaw et al.; U.S. Pat. No. 4,680,156, "Sheath Core Composite Extrusion And A Method Of Making It By Melt Transformation Coextrusion," issued Jul. 14, 1987, to Collier; and U.S. Pat. No. 5,219,508, "Method Of Manufacturing Sheath Core Fiber," issued Jun. 15, 1993, to Collier et al. The dip coating process shown in FIG. 2 is scalable for creating processing uniform filament coatings.

For instance, the coating bath can be a MWCNT-OH/PLA/chloroform dispersion. In the case of dip coating a more viscous coating solution is used for controlling the final coating thickness. In one embodiment this viscosity increase is achieved by increasing the solids weight percent in the chloroform to 40 mg/ml of solvent. As the filament passes through the bath (such as shown in FIG. 2), a thin MWCNT/PLA shell is deposited onto the filament surface. The drying time is rapid enough such that the filament bulk is not damaged by the chloroform, and recovers its original mechanical properties after vacuum drying in an oven at 100° C. for 24 hours. The filament coating can be a MWCNT/PLA composite film because a MWCNT-only coating would generally not be sufficiently bonded to the surface to survive a 3-D printing process intact.

Figure 3:
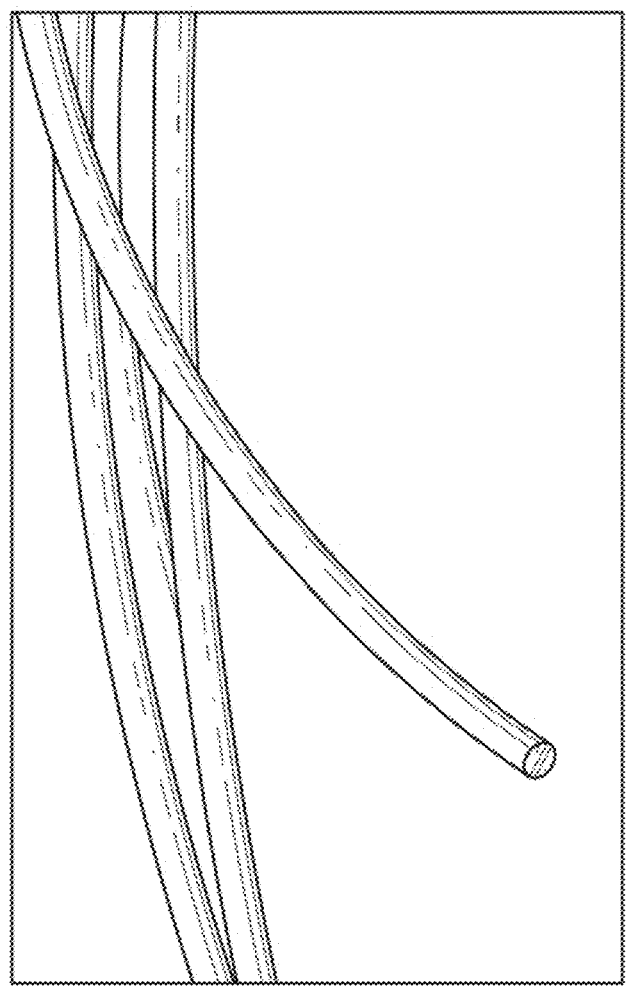
FIG. 3 is an illustration of a carbon nanotube/PLA-coated filament.

FIG. 3 is an illustration of a carbon nanotube/PLA-coated filament made with the dip coating process described and depicted in FIG. 2.

Carbon Nanotubes

Types of carbon nanotubes used in the present invention include single-wall carbon nanotubes, multi-walled carbon nanotubes, functionalized carbon nanotubes, etc. Other forms of microwave absorbing nanomaterials can also be used, including carbon black, buckyballs, graphene, superparamagnetic or magnetic nanoparticles, metallic or semiconducting nanowires and quantum dots, and certain conductive polymers, such as polyaniline (PANI) or poly3,4-ethylenedioxythiophene polystyrenesulfonate (PEDOT: PSS).

Microwave Heating

Figure 4:
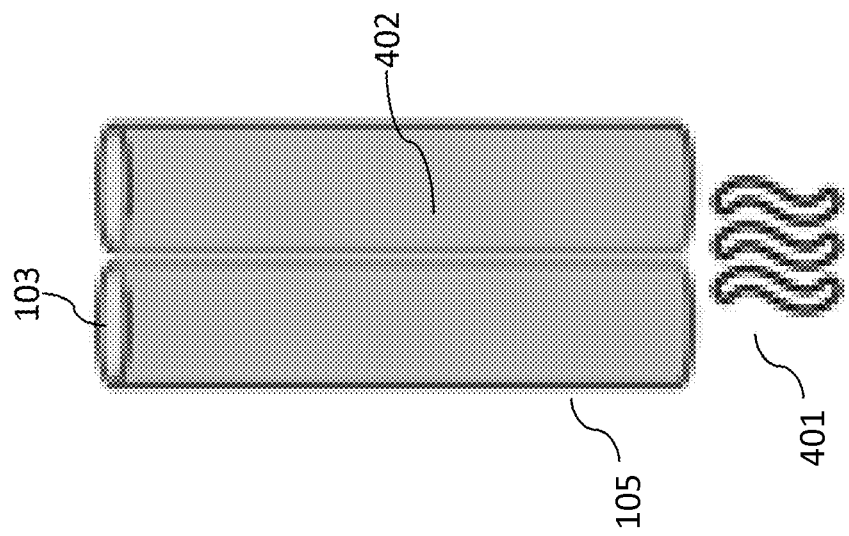
FIG. 4 illustrates a process in which the coated polymer filaments (after the spray deposition shown in FIG. 1) are exposed to microwave heating.

FIG. 4 illustrates a process in which the coated polymer filaments 103 (after the spray deposition shown in FIG. 1) are exposed to microwaves 401. Although the pure polymer filaments 103 are relatively insensitive to the microwaves 401, the carbon nanotubes in the coating 105 display an extraordinary sensitivity to microwave exposure and these generate localized heating. This localized heating is discussed and described, for example, in Irin, F., et al., "Detection of carbon nanotubes in biological samples through microwave-induced heating," *Carbon*, 2012, 50, (12), 4441-4449 and Vegesna, S., et al., "Non-destructive Technique for Broadband Characterization of Carbon Nanotubes at Microwave Frequencies," *Journal of Electromagnetic Waves and Applications*, 2013, 27, (11), 1372-1381. The localized heating of the microwaved carbon nanotubes causes selective fusing at the filament-filament interface 402, which allows for polymer diffusion and formation of a continuous polymer structure that is markedly different than the native, as-printed, 3D structure. The polymer filaments 103 are able to fuse at the filament-filament interface 402 once adjacent polymer filaments 103 wet at the filament-filament interface 402 and the polymer chains are able to inter-diffuse across the interface. For example, polymer filaments 103 can wet at the filament-filament interface 402 by melting or, for polymers that do not melt (such as amorphous polymers), they can flow as non-Newtonian fluids when the polymer filament 103 is raised to a temperature significantly above its glass transition temperature.

The microwaves can be applied during or after the 3D printing process. In some embodiments, the microwaves 401 are applied during post-fabrication of the object once the additive manufacture process is complete. In other embodiments, the microwaves are applied as the successive layers are being laid down (i.e., an "in-situ" process). Such an in-situ process can be employed by a focused microwave beam to heat the filament-filament interface during the printing process itself, which integrates the microwave exposure system into the 3D printer hardware (with appropriate electromagnetic shielding). "Welding" these filament-filament interfaces during manufacture strengthens the structure. An additional benefit is that this process enables certain shapes previously unattainable by conventional extrusion deposition processes to be manufactured. For instance, an extrusion deposition process typically cannot produce overhanging structures or large gaps, since they would be unsupported during the build. Although large unsupported bridging has been demonstrated *(http://www.thingiverse.com/thing:12925, http://youtu.be/_b6hFFcLh_Q and http://youtu.be/wK2APNwEoSk)*, printing additional layers over the bridge generally results in sagging due to the latent heat of the subsequent polymer bead and the added weight. By increasing the strength of the welds during the 3D printing process with the invention described herein, such bridge-like structures may be obtained with better dimensional tolerances. This is important for complex parts, where significant amounts of breakaway or dissolvable support material are typically utilized.

Polymer Filament Bundle

Figure 5:
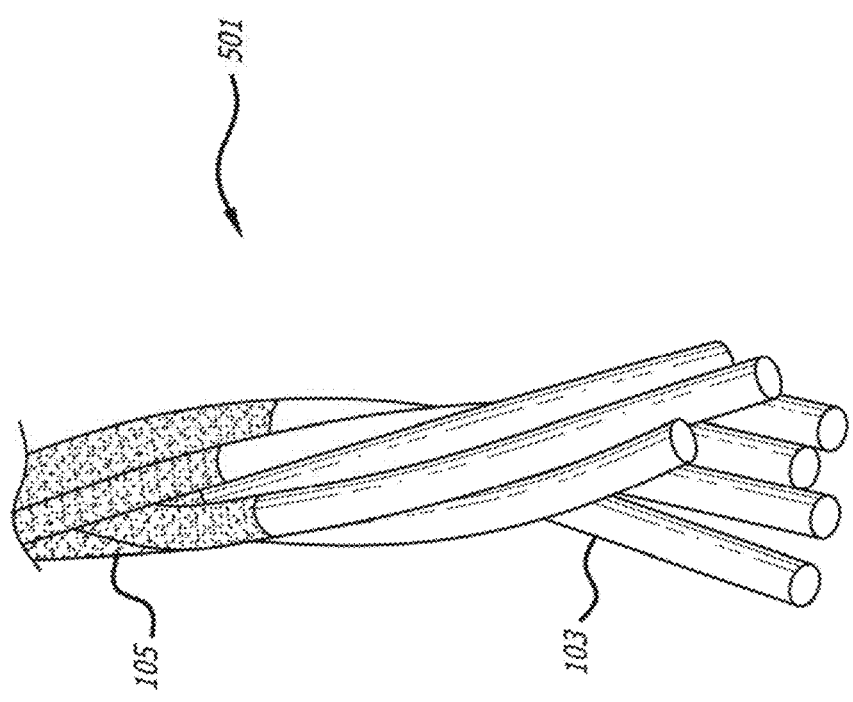
FIG. 5 is an illustration of polymer filaments partially coated by spray deposition (as shown in FIG. 1) and then exposed to microwave heating (as shown in FIG. 4).

FIG. 5 is an illustration of a polymer filament bundle 501 of polymer filaments 103 partially coated (with coating 105) by spray deposition (as shown in FIG. 1) and then exposed to microwave heating (as shown in FIG. 4). The polymer filaments 103 were made of ABS and were exposed with microwaves 401 (at around 2.45 GHz for around 20 seconds in a conventional microwave oven) to form a fused structure with minimal air gaps between the filaments (in the coated section of the polymer filaments 103). In contrast, the uncoated portion of the polymer filaments 103 (i.e., the microwave transparent ABS filament portions) were unaffected by the microwave treatment process 401 and did not fuse together.

Crosshatch Stack

Figure 6:
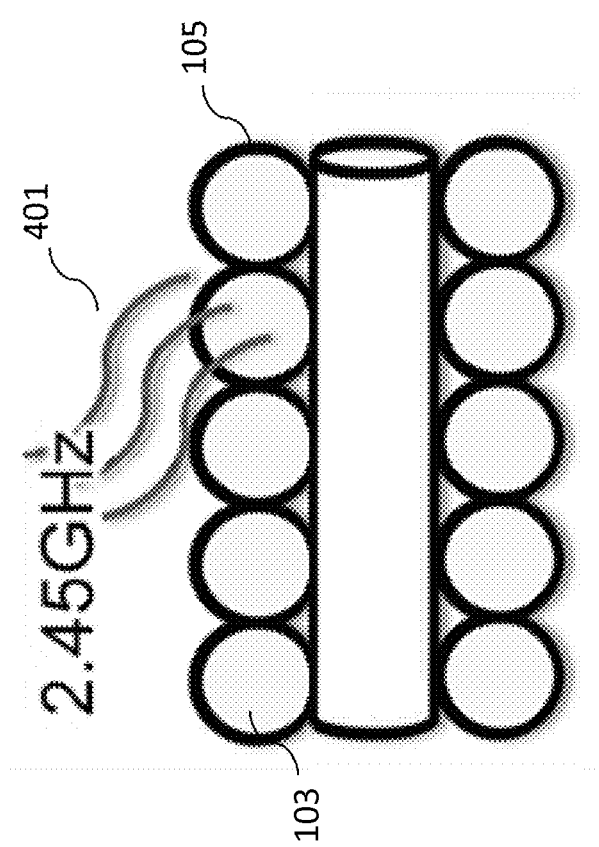
FIG. 6 illustrates polymer filaments (after the spray deposition shown in FIG. 1) arranged in a crosshatch stack arrangement being exposed to microwaves.
Figure 7:
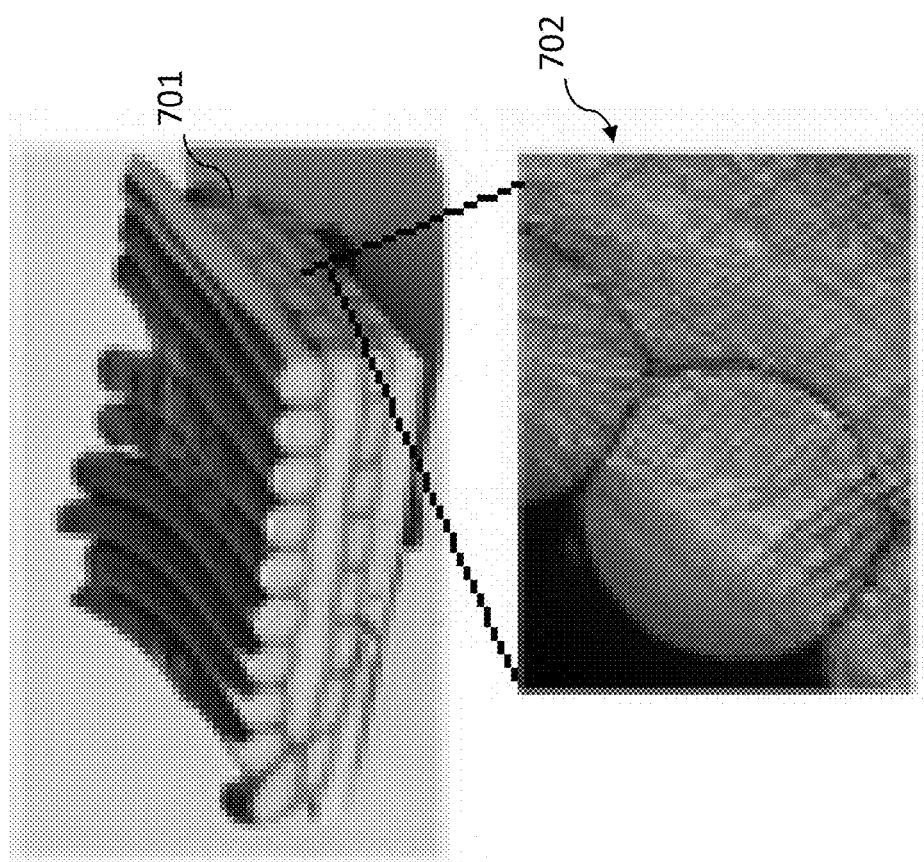
FIG. 7 is a photograph of a microwave-fused crosshatch stack made by coating polymer filaments by spray deposition (as shown in FIG. 1) and arranging and then exposing the crosshatch stack of coated polymer filaments to microwaves (as shown in FIG. 6). The magnified portion in this

FIG. 6 illustrates polymer filaments 103 (after the spray deposition shown in FIG. 1 to form coating 105 on the exterior) arranged in a crosshatch stack arrangement being exposed to microwaves 401. FIG. 7 is a photograph of a microwave-fused crosshatch stack 701 made by coating polymer filaments by spray deposition (as shown in FIG. 1) and arranging and then exposing the crosshatch stack of coated polymer filaments to microwaves (as shown in FIG. 6). Magnified portion 702 is an optical microscope image of the microwave-fused crosshatch stack 701. The polymer filaments 103 were ABS. The crosshatch stack of coated polymer filaments 103 were exposed with microwaves 401 (at around 2.45 GHz for around 20 seconds in a conventional microwave oven) to form a fused structure with minimal air gaps between the filaments. This filament fusion that occurs during the microwave exposure eliminates voids and improves load transfer.

Variables in this process include irradiation time, power, frequency, thickness of the CNT polymer sheath, CNT weight or volume fraction in the coating, and the coating process itself. In some embodiments, the irradiation time is between about 1 second and about 5 minutes, the irradiation power is between about 1 W and about 1 kW, and the CNT polymer sheath thickness is between about 100 nm and about 0.5 mm. Frequency of the microwaves can be controlled by the type of microwave source utilized.

Printed Object

FIG. 8 is two photographs of similarly made 3D printed objects (object 801 and object 802). Object 801 was made by an additive manufacturing process with pure ABS printer filament. Object 802 was made by the same additive manufacturing process with carbon nanotube coated ABS printer filament, which was treated post-printing with microwave irradiation.

With regard to object 802, the carbon nanotube dispersion was sprayed onto the pure ABS printer filament using an airbrush and then exposing the carbon nanotube coated printed part to microwaves at around 2.45 GHz for around 15 seconds in a conventional microwave oven. As with the other objects formed using embodiments of the present invention, this process formed a fused structure (object 1102) with minimal air gaps between the filaments.

Figure 9:
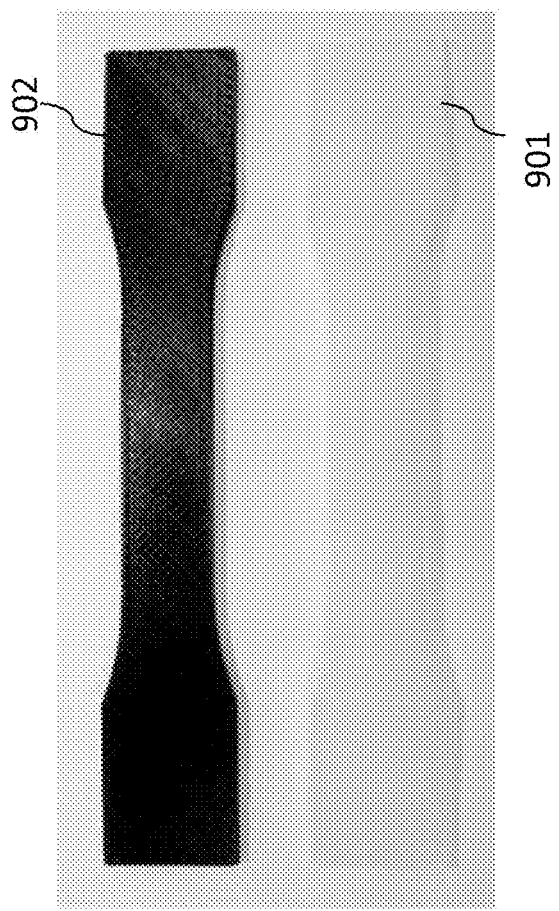
FIG. 9 is a photograph of tensile dogbone samples with (902) and without (901) CNTs incorporated into the printing process.
Figure 10:
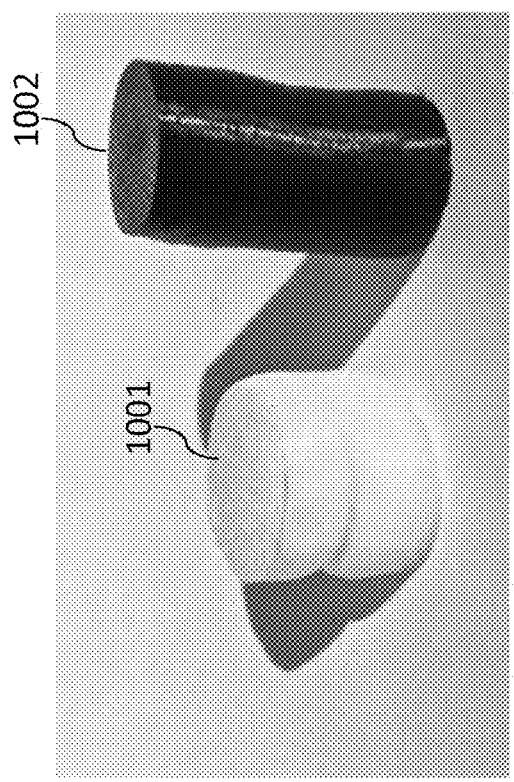
FIG. 10 is a photograph of compression testing samples with (1002) and without (1001) CNTs incorporated into the printing process. The image shows the samples after compression testing and the difference in compressive strength with the CNTs and microwave treatment applied to the sample.

FIGS. 9-10 are photographs of other 3D printed objects made from coated filaments. Objects 901 and 1001 are 3D printed objects made with only pure uncoated PLA printer filament. These were printed using an UP! Mini 3D Desktop Printer. Object 902 and 1002 are these 3D printed objects with the CNT coating applied and after exposure to microwaves.

Morphology

Figure 11:
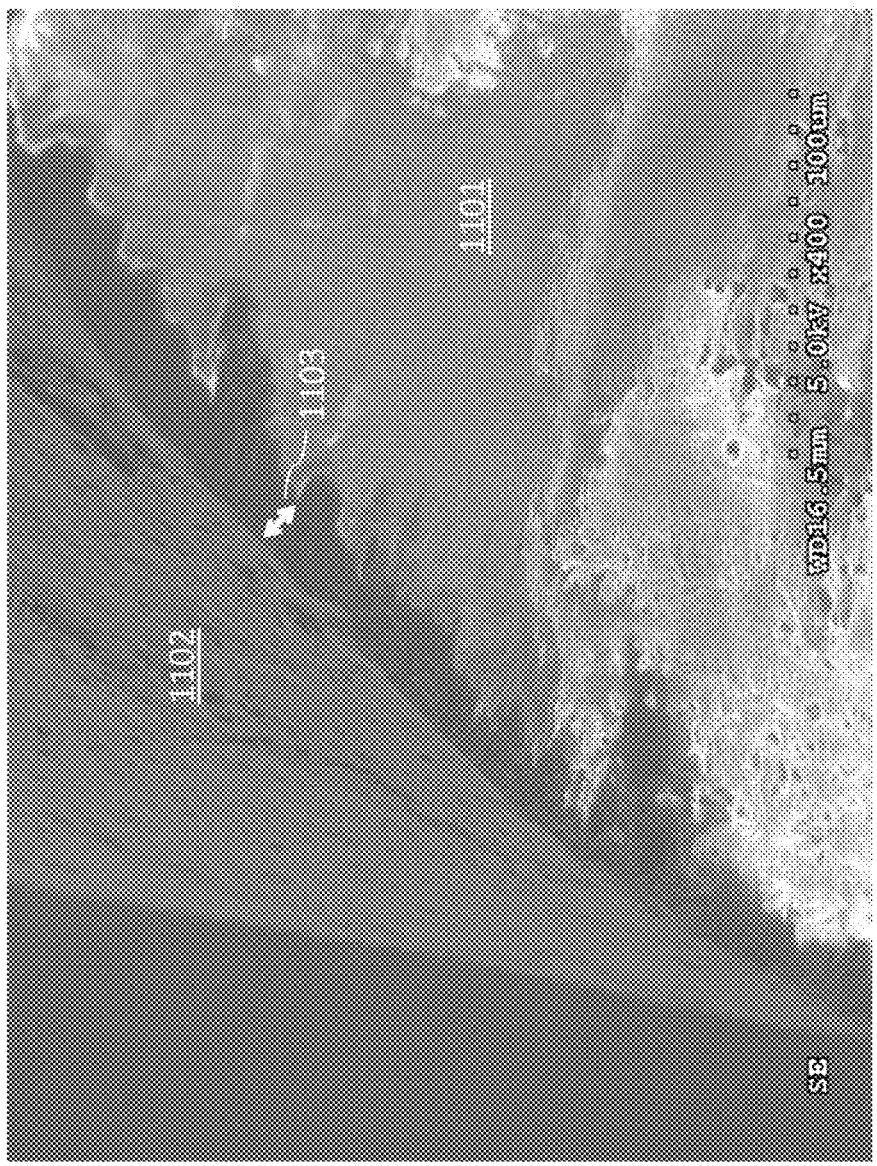
FIG. 11 is an SEM of a cross-sectional view of a polymer filament coated with a dispersion of carbon nanotubes.
Figure 12:
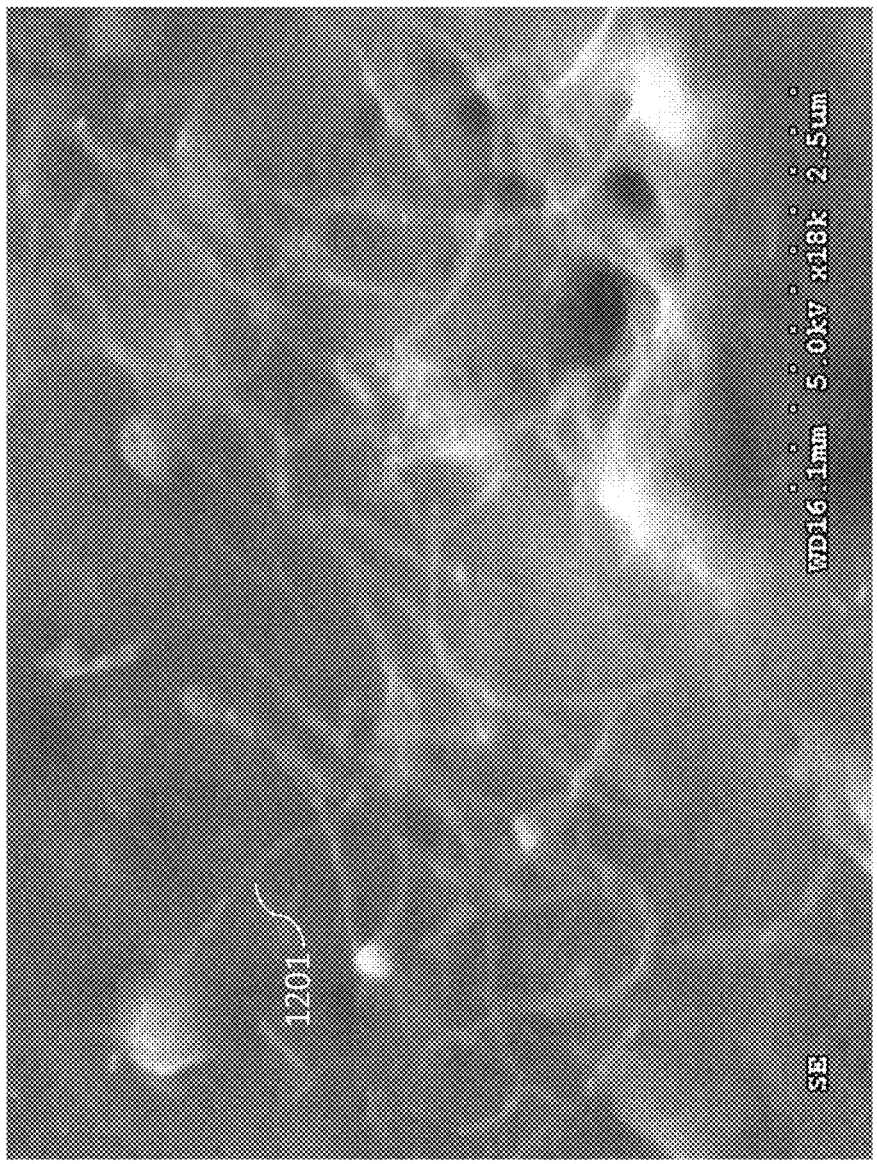
FIG. 12 is an SEM of the coated polymer filament of FIG. 11 (further magnified) showing the randomly oriented multi-walled carbon nanotubes.

FIG. 11 is an SEM of a cross-sectional view of a polymer filament 1101 coated with a dispersion of carbon nanotubes. The polymer filament 1101 is pure ABS. The coated polymer filament has not been irradiated with microwaves. The carbon nanotube coating 1102 (the coaxial CNT sheet) has a thickness 1103 of around 15 μm. FIG. 12 is an SEM of coated polymer filament 1101 (further magnified) showing the randomly oriented multi-walled carbon nanotubes 1201 in carbon nanotube coating 1102.

Figure 13:
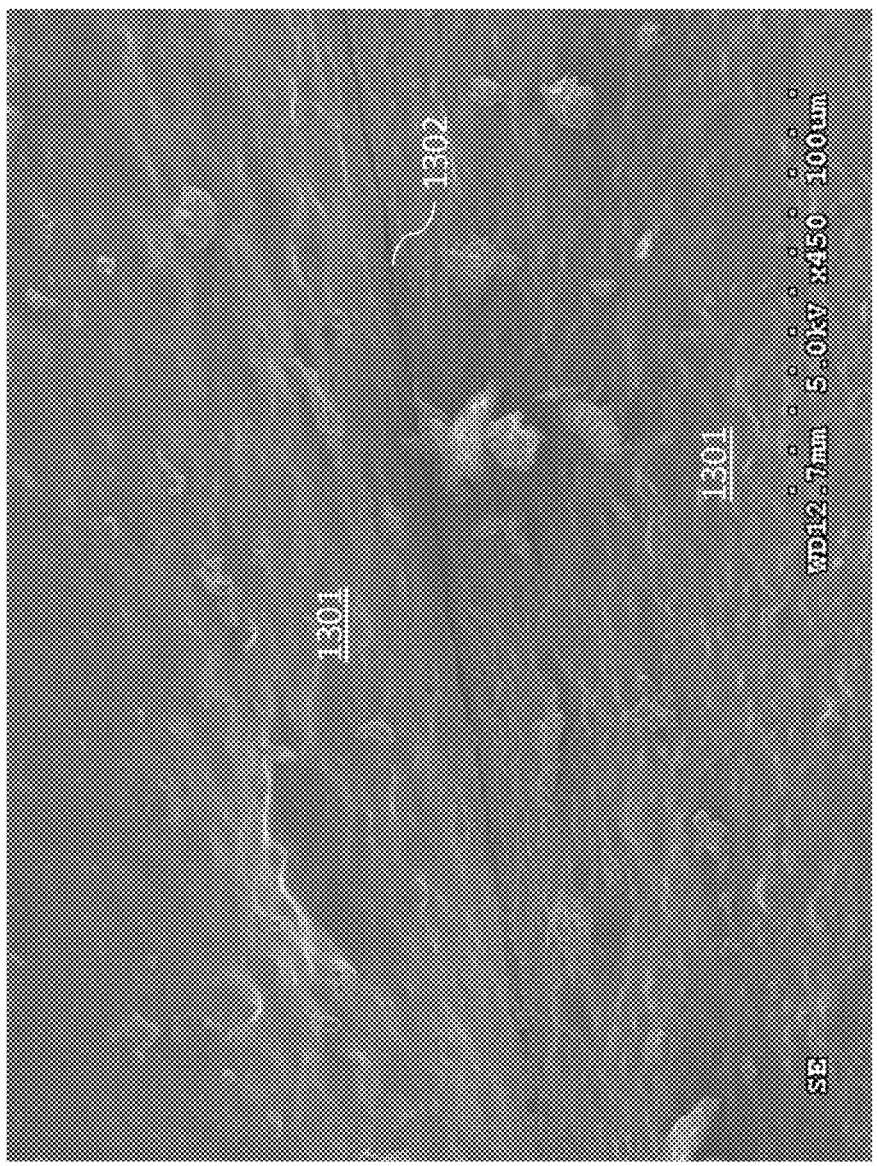
FIG. 13 is an SEM of a 3D printed object (viewed from the top surface) made by an embodiment of the present invention (after being irradiated with microwaves).
Figure 14:
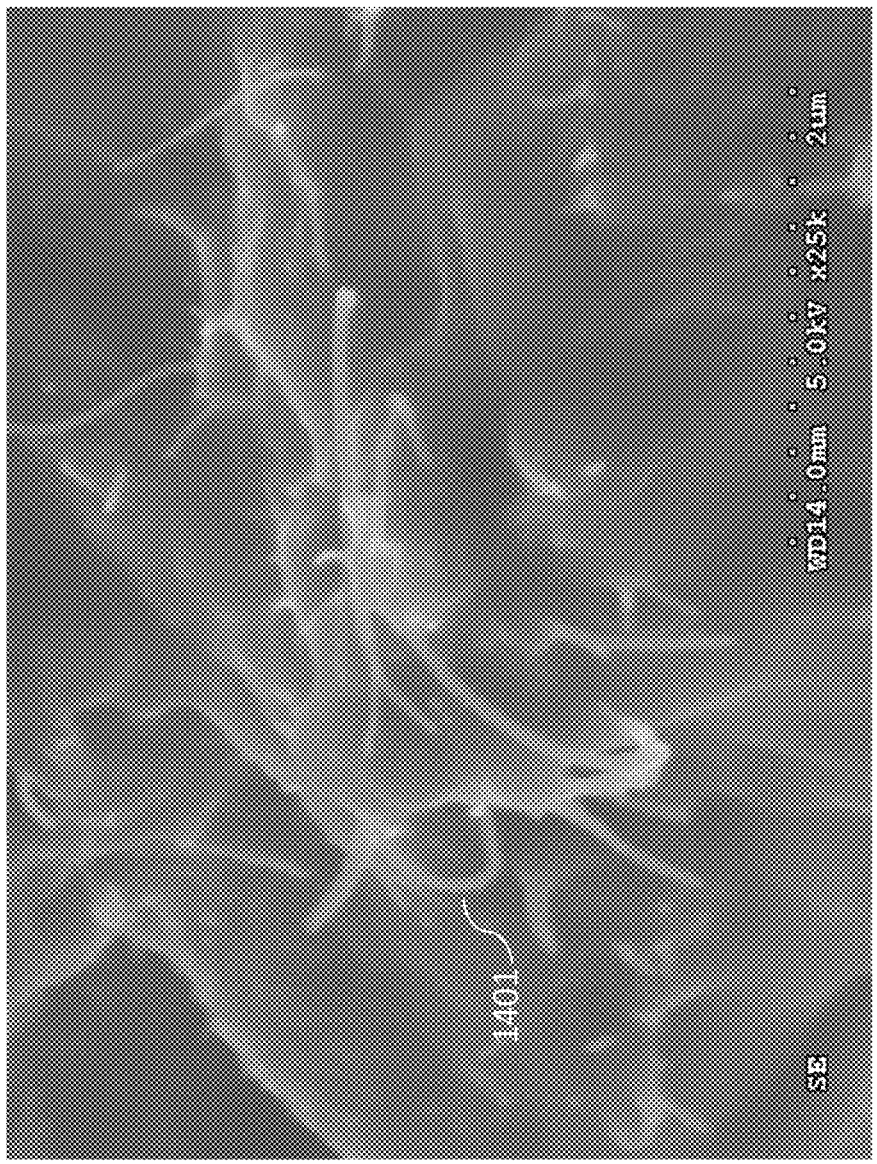
FIG. 14 is an SEM of the 3D printed object of FIG. 13 (viewed from the top surface and further magnified) showing the randomly oriented multi-walled carbon nanotubes.
Figure 15:
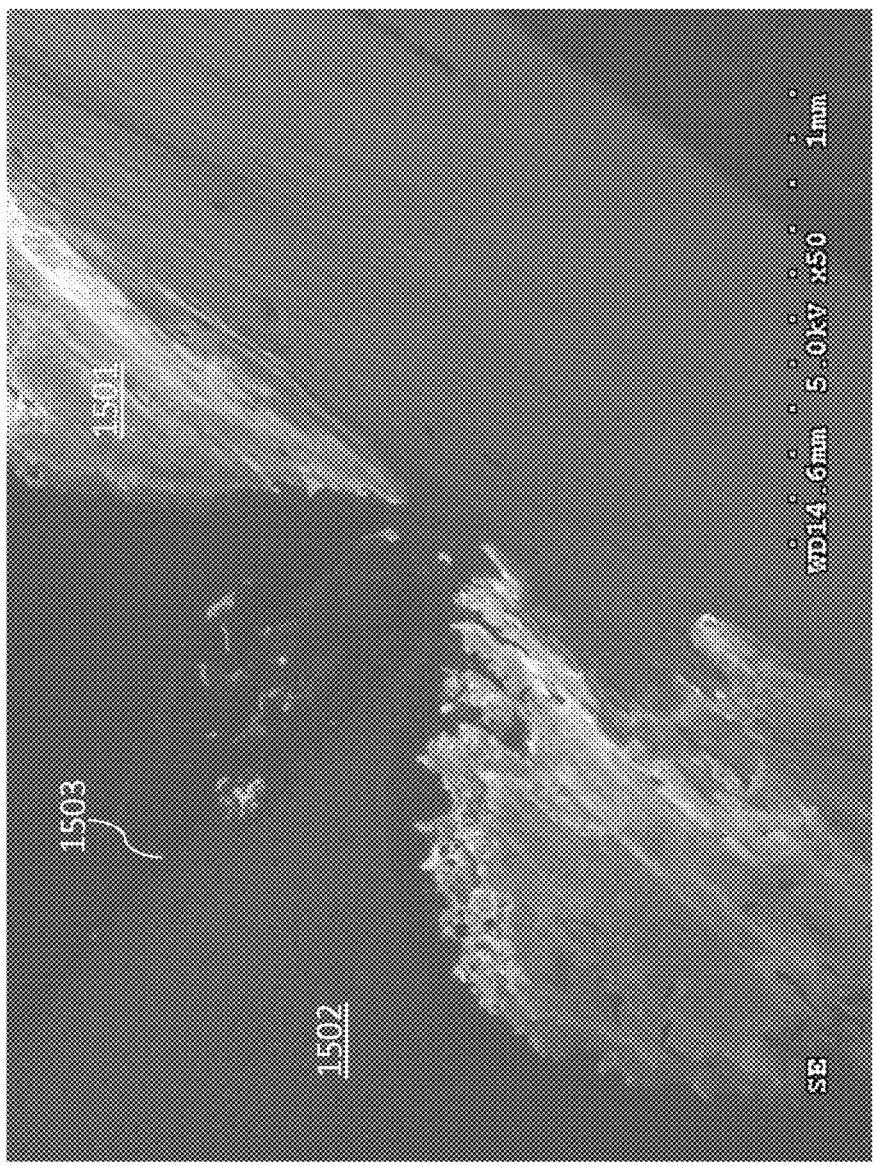
FIG. 15 is an SEM of a cross-section of the 3D printed object of FIG. 7.

FIG. 13 is an SEM of a 3D printed object (viewed from the top surface) made by an embodiment of the present invention (after being irradiated with microwaves). FIG. 13 shows the interface 1302 between two extruded polymer beads 1301. FIG. 14 is an SEM of the 3D printed object of FIG. 13 (viewed from the top surface and further magnified) showing the randomly oriented multi-walled carbon nanotubes 1401 in the carbon nanotube coating. The multi-walled carbon nanotubes have diameters between around 50 nm and around 80 nm. FIG. 15 is an SEM of a cross-section of the 3D printed object of FIG. 7. This cross-section shows the polymer filament 1501 (pure ABS), carbon nanotube coating 1502, and interface 1503 between the extruded polymer beads.

A comparison between the multi-walled carbon nanotubes 1201 (before irradiation with microwaves) in FIG. 12 and the multi-walled carbon nanotubes 1401 (after irradiation with microwaves) in FIG. 14 shows that the microwave irradiation process does not significantly damage or destroy the multi-walled carbon nanotubes.

Additionally, the post treatment images of FIGS. 13-15 shows the carbon nanotubes and polymer are in good contact and there is no visible bubbling or damage (i.e. burning) of the polymer. This revealed that the carbon nanotubes likely transferred (via conduction) their intense heat profile to the polymer and dissipated this heat to fuse the polymer interface without causing significant degradation.

Heat Response to Microwave Radiation

Microwave-induced CNT heating opens up the possibility of tunable polymer mobility and adhesion in polymer nanocomposite interfaces. This phenomenon could also be used to improve these polymer welds in 3-D printed parts. By connecting dielectric properties with in situ microwave thermometry, the present invention can control how the microwave response affects polymer film and filament adhesion in an additive manufacturing context.

It has been discovered that there is a non-linear, non-monotonic microwave absorbance response in the filaments as a function of carbon nanotube loading. Above a threshold carbon nanotube loading, the heating response increased sharply, indicating that the carbon nanotubes' microwave response is affected by carbon nanotube network connectivity (percolation). This was unexpected and not previously reported.

It is believed that the heating response of CNT-loaded polymer nanocomposites is non-linear and non-monotonic because of the dielectric properties of electrically percolating CNT networks (i.e., due to a connection between microwave heating adsorption and the dielectric properties of the CNT/polymer nanocomposites).

Polyactic acid (PLA), which is commonly utilized in additive manufacturing, was mixed with commercially available multi-walled carbon nanotubes at various weight percentages. For example, —OH functionalized multi-walled carbon nanotubes were dispersed in a PLA/chloroform solution and these dispersions were used to solution cast and hot press MWCNT/PLA films at varying levels of MWCNT loading between 0.00 and 10.0 weight percent. After casting these films, characterization of these included DC and AC electrical property testing, infrared thermometry (effectively using imaging to carry out in situ microwave calorimetry), and Differential Scanning calorimetry (DSC).

These measurements indicated a dramatic increase in microwave absorbance at MWCNT loadings above the electrical percolation threshold. It is believe that this increase in heating response is caused by a transition from a disconnected network of the conducting carbon nanotubes to a connected network. The induced electric current magnitudes on the carbon nanotubes due to microwave radiation are significantly increased above this threshold, resulting in high power dissipation through heating. It is further believed that below this threshold, the gaps between the carbon nanotubes in the disconnected network inhibit current flow due to the high impedances in the matrix.

Figure 16B:
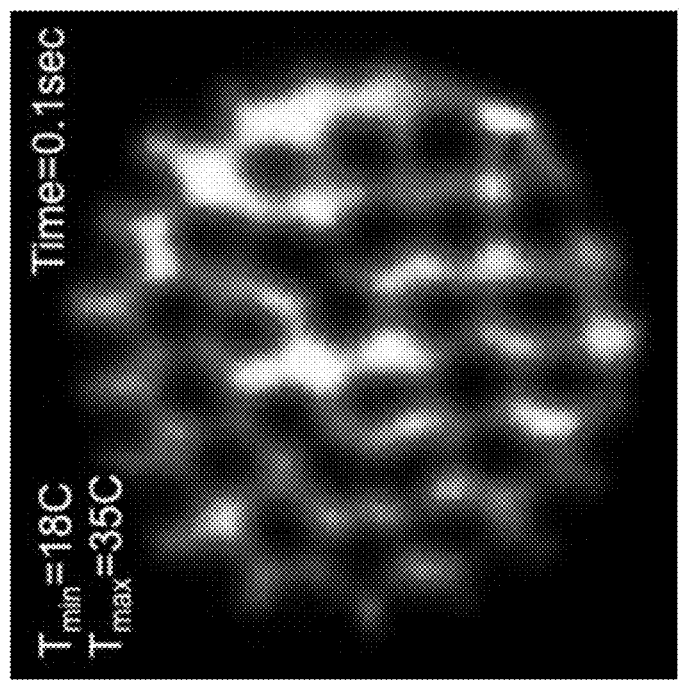
FIG. 16B is an image from a forward-looking infrared (FLIR camera) of the temperature profile of the bundle of FIG. 16A upon microwave exposure.
Figure 16A:
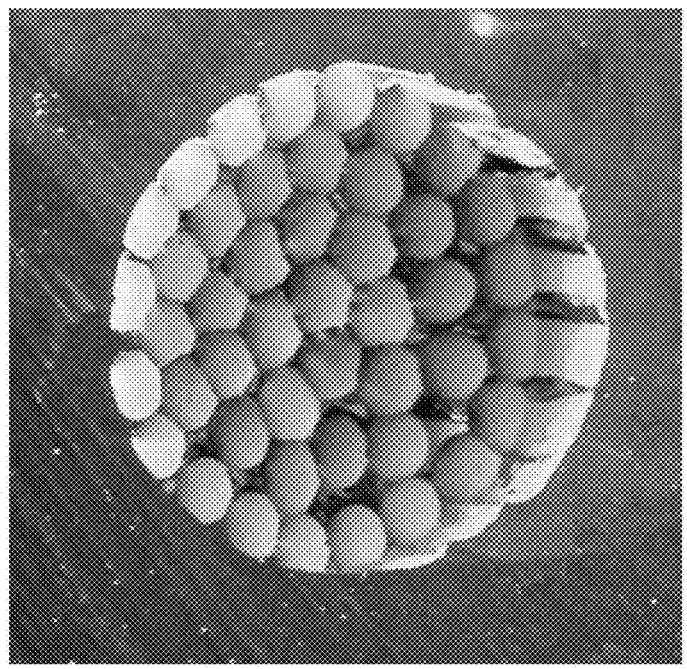
FIG. 16A is a photograph of a bundle of multi-wall carbon nanotube coated PLA filaments.

FIG. 16A is a photograph of a bundle of multi-wall carbon nanotube coated PLA filaments. FIG. 16B the FLIR for microwave exposure of a bundle of the MWCNT-coated PLA filaments (198 W, 20 seconds of exposure), the selected video frame shows the heating profile after 0.1 seconds of exposure and the depicted 17° C. rise in temperature (from 18° C. to 35° C.) illustrates the rapidness of the heating process. The data show localized heating effects, confirming that the heating is restricted to the MWCNT-enriched regions, promoting inter-filament welds, similar to simulation results in FIG. 27 (discussed below). Over the course of the analysis, the spatially averaged sample temperature rose by 58.5° C. This data in FIG. 16B indicate that the prospect of coating the filament with microwave-responsive CNTs is effective.

Electrical Properties

The heating can be tailored based upon the electrical properties of the resulting film. Such electrical properties include conductivity, loss tangent, and dielectric properties.

The DC and AC conductivities of the PLA films loaded with various multi-walled carbon nanotube loadings were measured. DC measurements were conducted using a four-point-probe. These AC measurements were performed with a low-power microwave network analyzer using coaxial lines and rectangular waveguides on the PLA/multi-walled carbon nanotube samples (rectangular PLA/multi-walled carbon nanotube samples, 0.5 mm thick, inserted in a rectangular waveguide). The scattering parameters (transmission and reflection coefficients) were measured using an Agilent microwave network analyzer and were used to extract the dielectric properties of the samples after proper calibration. Since a waveguide was used for the measurements, a thru-reflect-line (TRL calibration) was performed to correct for the coax to waveguide adapters and input and output waveguide sections.

Figure 17:
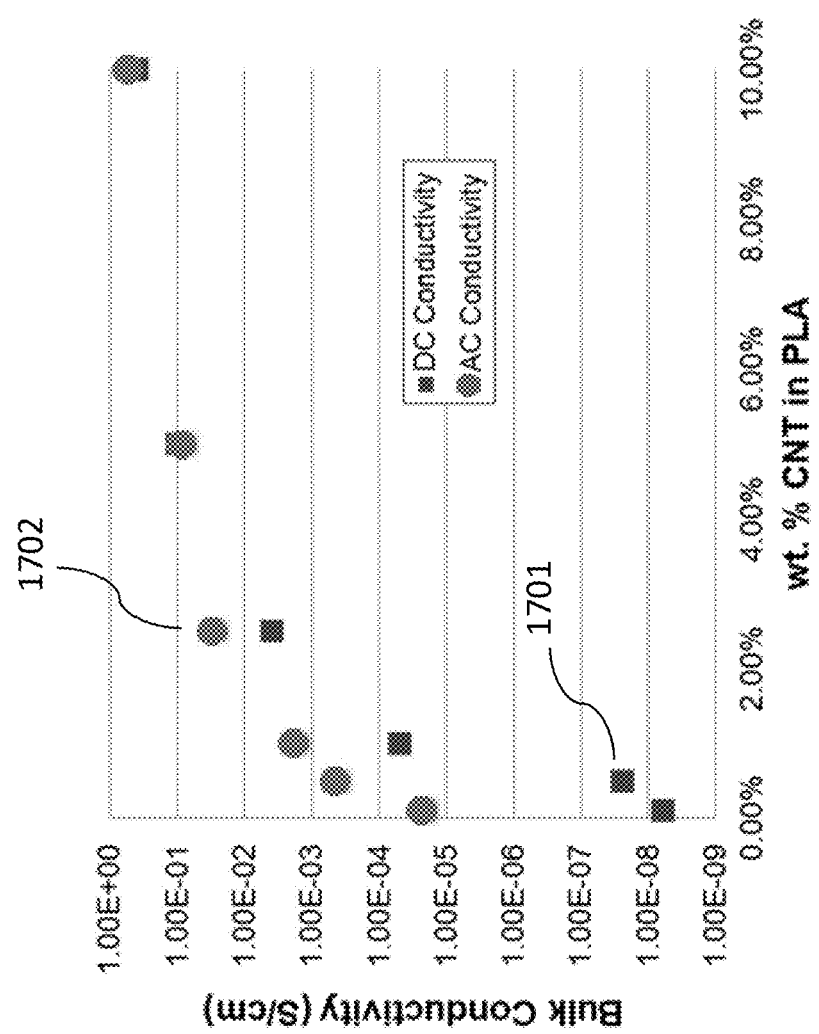
FIG. 17 is a graph reflecting the DC conductivity (1701) and AC conductivity (1702) versus the multi-walled loading in PLA films.
Figure 18:
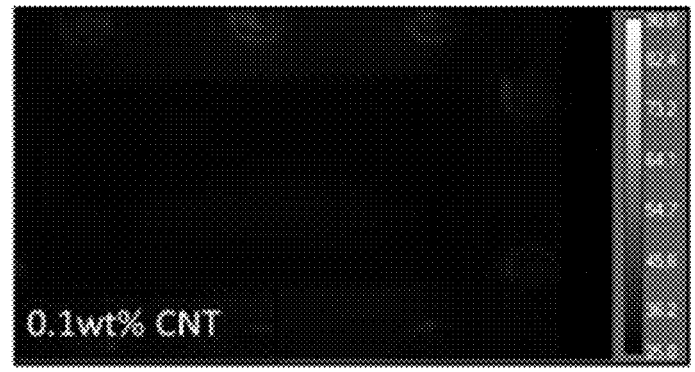
FIG. 18 is an image from a forward-looking infrared (FLIR camera) of a PLA/multi-walled carbon nanotube samples with a loading of 0.1 wt %.
Figure 19:
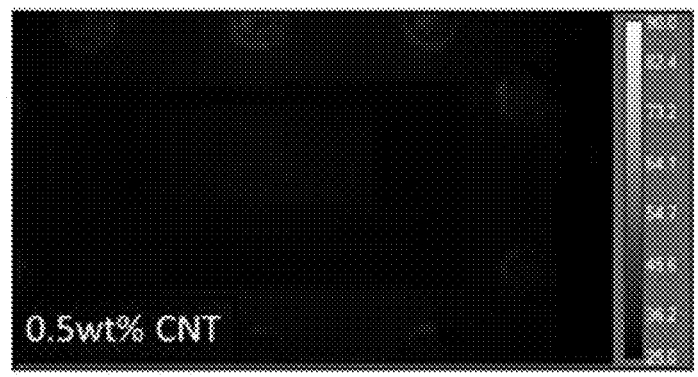
FIG. 19 is an image from a FLIR camera of a PLA/multi-walled carbon nanotube samples with a loading of 0.5 wt %.

FIG. 17 is a graph reflecting the DC conductivity (1701) and AC conductivity (1702) versus the multi-walled nanotube weight percent loading in PLA films. As shown in FIG. 17, the AC (at 2.45 GHz) and DC conductivity values are the same for percolated, resistive carbon nanotube networks at high carbon nanotube loading (greater than 5 wt %), but AC conductivity is higher at low carbon nanotube loading (less than 3 wt %).

Other microwave material characterization methods (such as using coaxial lines that operate over a very broad frequency range—from DC to microwaves) can be used to yield dielectric constant and conductivity data. Such data can be used to determine optimal carbon nanotube concentrations needed, and may reveal frequency dependent features (resonances) which can be exploited for tailoring the heating response.

Temperature Profile

Temperature profiles of the PLA/multi-walled carbon nanotube samples set forth above were also examined to show their thermal response to high power (10-100 W) microwave radiation at 2.45 GHz in a controlled environment. The in-situ microwave calorimetry setup used a forward-looking infrared (FLIR) camera to image the temperature increase at the center of the homogeneous films placed inside a rectangular waveguide, which in turn was connected to a microwave generator. (FLIR® Systems, Inc.). The FLIR looks at the sample through a metal mesh window covering the open end of the waveguide. An electromagnetic RF meter is used to ensure safety during microwave radiation.

PLA/multi-walled carbon nanotube samples (with loadings of 0.1 wt %, 0.5 wt %, 1 wt %, 2.5 wt %, 5 wt %, and 10 wt % were tested. The FLIR camera showed thermal images of PLA films (inside the waveguide) at varying MWCNT loadings after 30 seconds of 20 W microwave exposure at 2.45 GHz in a custom waveguide. FIGS. 18, 19, 20A, 21A, 22A, and 23A. As shown in these Figures, the heating response dramatically increases as the loading is increased to 2.5 wt % carbon nanotubes. It is believed that this was related to the onset of a resistive (rather than capacitive) percolating network.

FIGS. 22A and 23A also show that the heating responses decreases (and changed in spatial distribution) as the loading changes from 5 wt % to 10 wt %. It is further believed that this is related to the transition from power absorbance to microwave power reflectance associated with high conductivity networks. The unusual, non-monotonic heating progression indicates an overall picture of microwave power transmission (in sub-percolation samples), microwave power absorbance (samples with nanofiller loadings just above percolation), and microwave power reflectance in highly conductive samples. This further indicates a beneficial range of CNT content for microwave heating.

Figure 24:
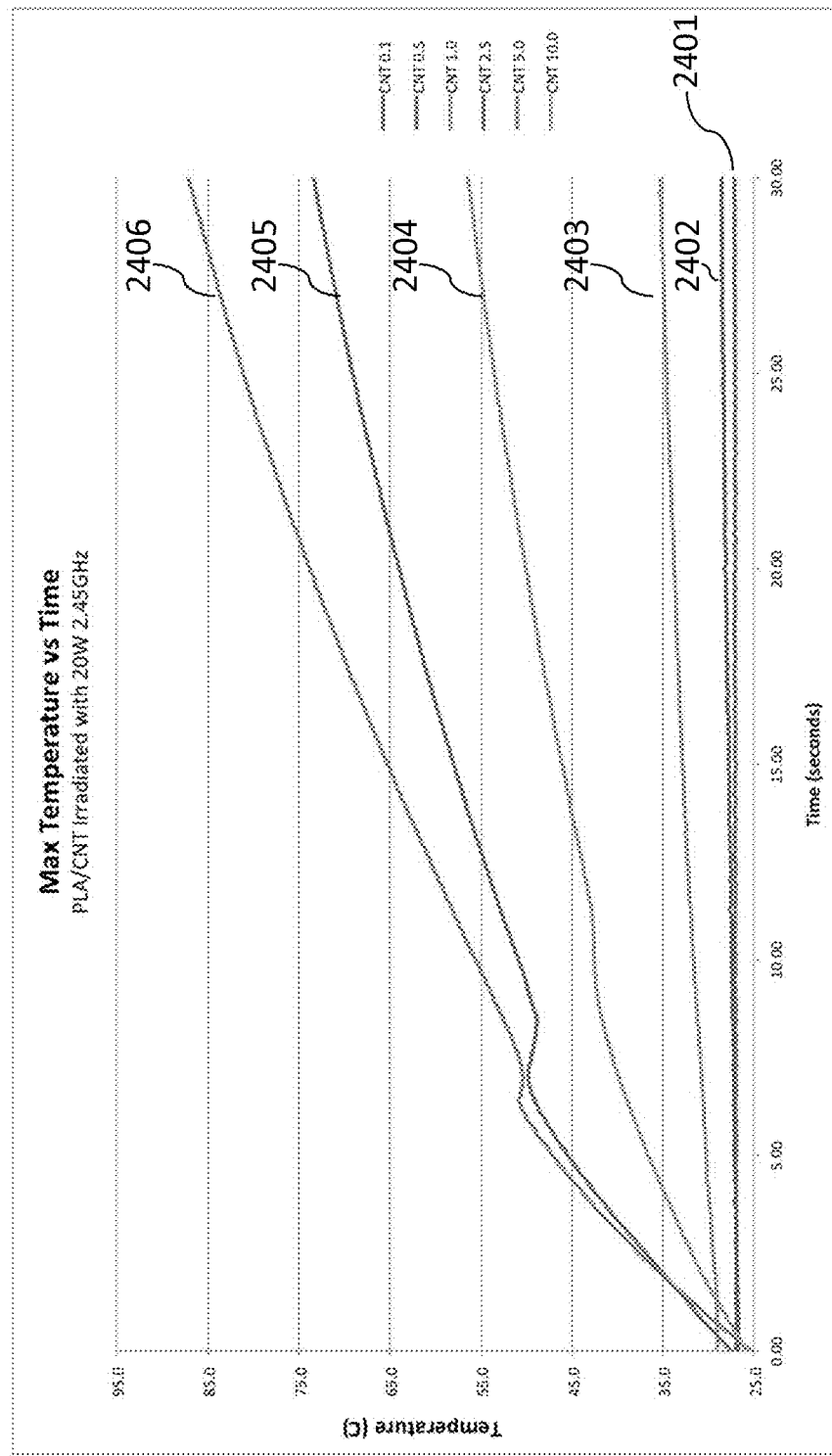
FIG. 24 is a graph of the maximum temperature versus time of PLA/multi-walled carbon nanotube samples (with loadings of 0.1 wt %, 0.5 wt %, 1 wt %, 2.5 wt %, 5 wt %, and 10 wt %).

FIG. 24 shows the maximum temperature versus time of the PLA/multi-walled carbon nanotube samples (with loadings of 0.1 wt %, 0.5 wt %, 1 wt %, 2.5 wt %, 5 wt %, and 10 wt %) (2401-2406, respectively).

Differential Scanning Calorimetry

Figure 25A:
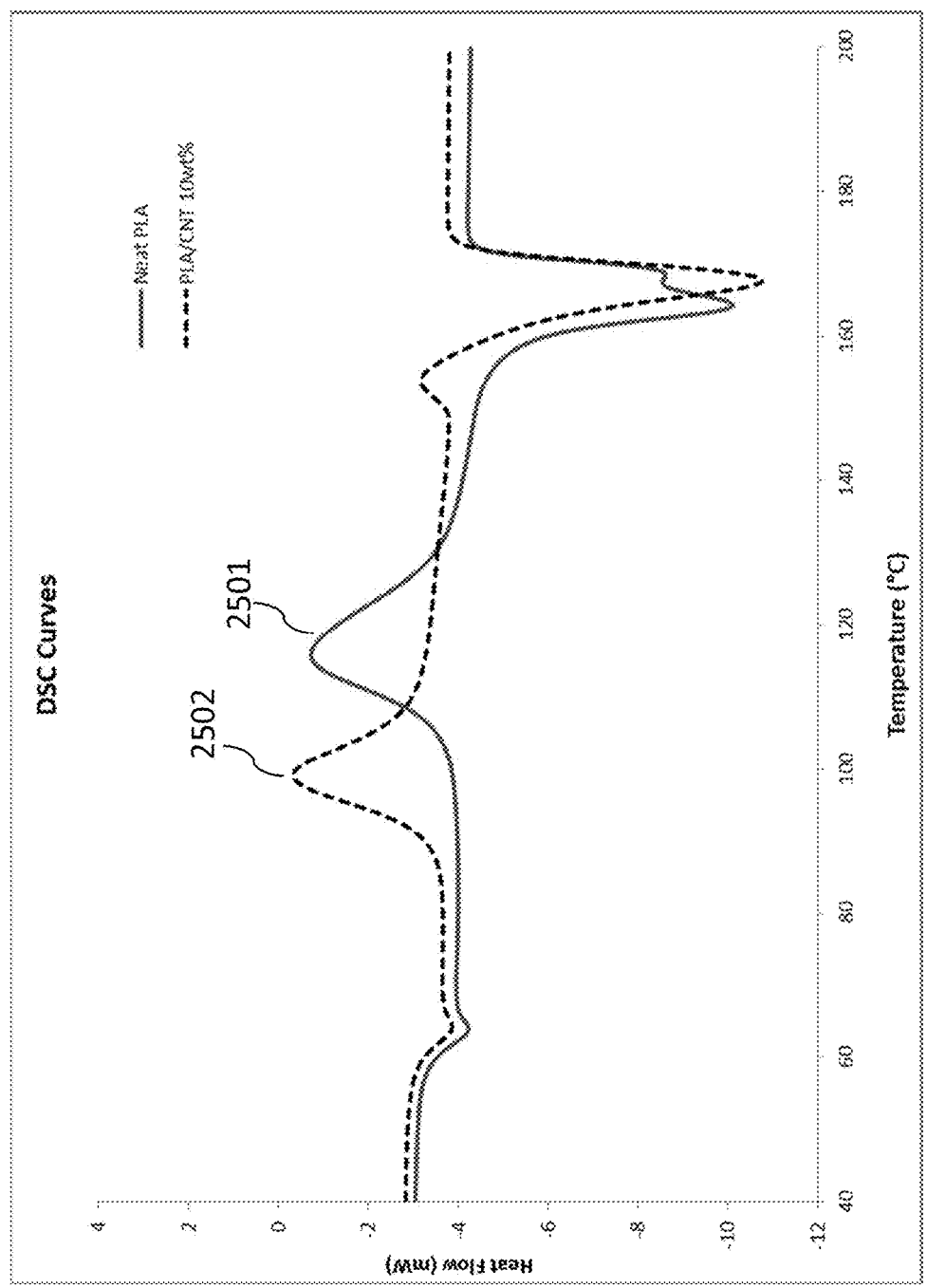
FIG. 25A is a graph of the DSC curves for neat PLA and PLA/multi-walled carbon nanotube (10 wt %).
Figure 25B:
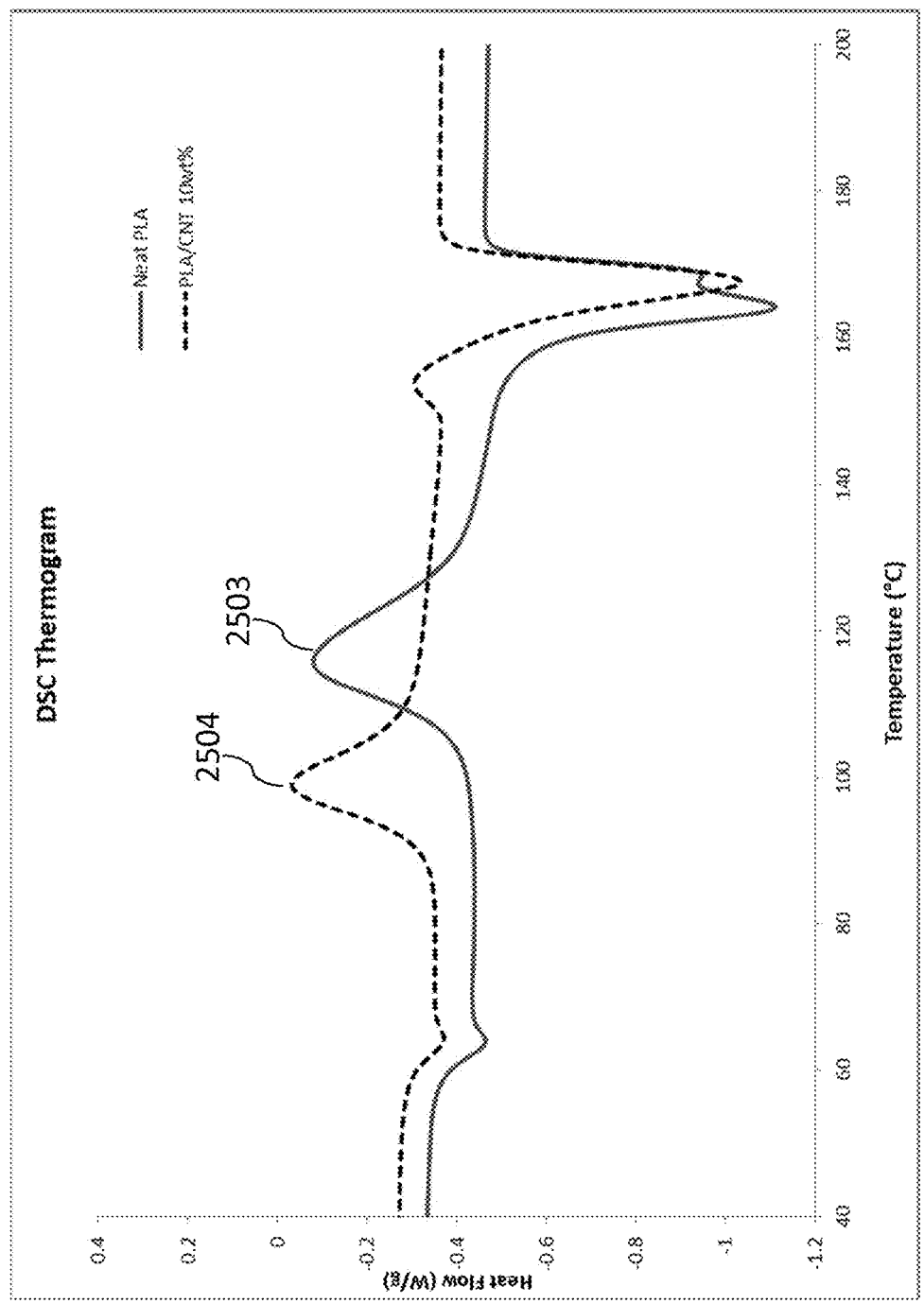
FIG. 25B is a graph of the DSC thermogram for neat PLA and PLA/multi-walled carbon nanotube (10 wt %).
Figure 25C:
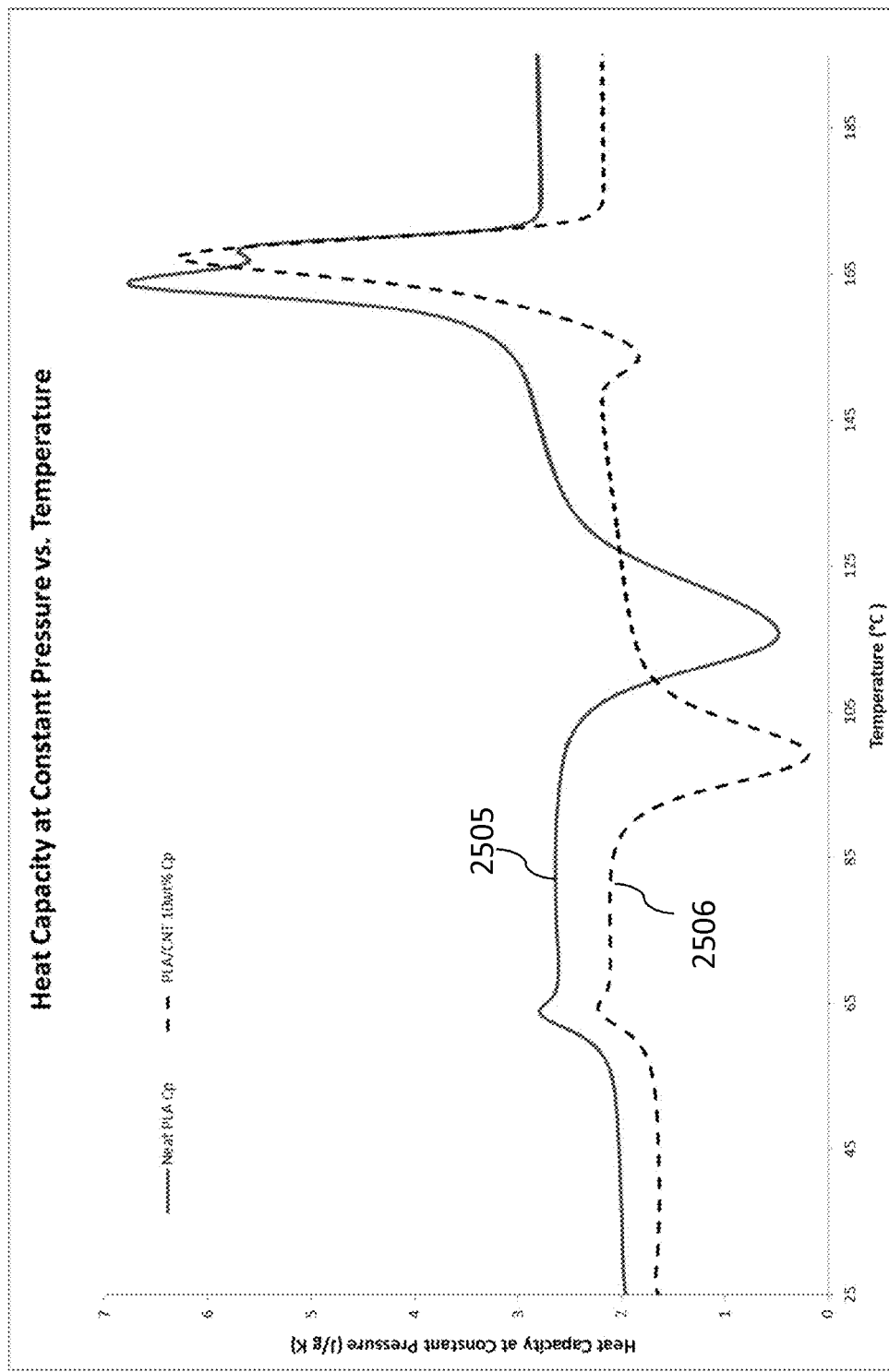
FIG. 25C is a graph showing the heat capacity at constant pressure versus temperature for neat PLA and PLA/multi-walled carbon nanotube (10 wt %).

Differential Scanning calorimetry (DSC) was used to measure the melting point, crystallization temperature and glass transition temperatures of the neat PLA and PLA/multi-walled carbon nanotube samples set forth above. FIG. 25A shows the DSC curves for neat PLA (2501) and PLA/multi-walled carbon nanotube (10 wt %) (2502). FIG. 25A shows the DSC thermogram for neat PLA (2503) and PLA/multi-walled carbon nanotube (10 wt %) (2504). These measurements indicate the precise temperatures at which the polymer is likely to form strong welded interfaces. Most thermoplastic polymers must be heated beyond their glass transition temperature in order to form a bond or weld. The DSC also yielded estimates of the differentiable heat capacity as a function of temperature that correlated with the results of the temperature profiles obtained through FLIR imaging. FIG. 25C shows the heat capacity at constant pressure versus temperature for neat PLA (2505) and PLA/multi-walled carbon nanotube (10 wt %) (2506). The DSC measurements indicated that the $T_g$ of the PLA is correlated with a plateau in the dynamic temperature versus time response in the FLIR-imaged samples (~60° C.).

Microwave Interaction with Carbon Nanotube-Loaded Polymers

The heating behavior of the microwaves is based on the sample geometry, the applied electromagnetic field and the materials' dielectric properties. Simulation and modeling was utilized to investigate the underlying science of microwave response of CNT-loaded polymers. Simulation and modeling aids in the investigation of the effect of various parameters (CNT loading, microwave power, sample thickness) on the heating response.

Modeling microwave heating involves electromagnetic modeling as well as thermal/heat transfer modeling. Commercial software from ANSYS (High Frequency Structure Simulator, HFSS) for the electromagnetic simulation coupled with ANSYS Mechanical for the thermal simulation is utilized. COMSOL Multiphysics is also utilized for comparison with ANSYS results. Modeling CNT-loaded polymers exposed to microwaves is a challenging problem due to the drastic difference between the dimensions of CNTs (nanometers) and the bulk sample (centimeters). Direct simulation is not possible due to the vast computational resources needed.

Simulation results using ANSYS HFSS are shown in FIGS. 20C, 21C, 22C, and 23C (alongside experimental data for comparison in FIGS. 20B, 21B, 22B, and 23B, respectively) for simulations of slabs of a lossy dielectric in a rectangular waveguide. The loadings of the samples in the simulations of FIGS. 20C, 21C, 22C, and 23C (and experiments of FIGS. 20B, 21B, 22B, and 23B) were 1 wt %, 2.5 wt %, 5 wt %, and 10 wt %, respectively. The simulations required an input value of loss tangent, which was experimentally measured for samples of varying CNT loading. The loss tangent and dielectric constant for these samples were taken from waveguide measurements on the nanocomposite films with varying CNT loading. These measured loss tangent and dielectric constant values were used for the simulations, and the resulting spatial distributions again show the microwave transmission, absorbance, and reflectance.

The similarity between the two datasets (of (a) FIGS. 20C, 21C, 22C, and 23C and (b) FIGS. 20B, 21B, 22B, and 23B) was remarkable. As CNT loading increased, the samples' microwave response underwent two transitions: from power transmission to absorbance to reflectance. This remarkable agreement between simulation and experiment for CNT/microwave interactions is completely new and not previously reported.

Figure 26:
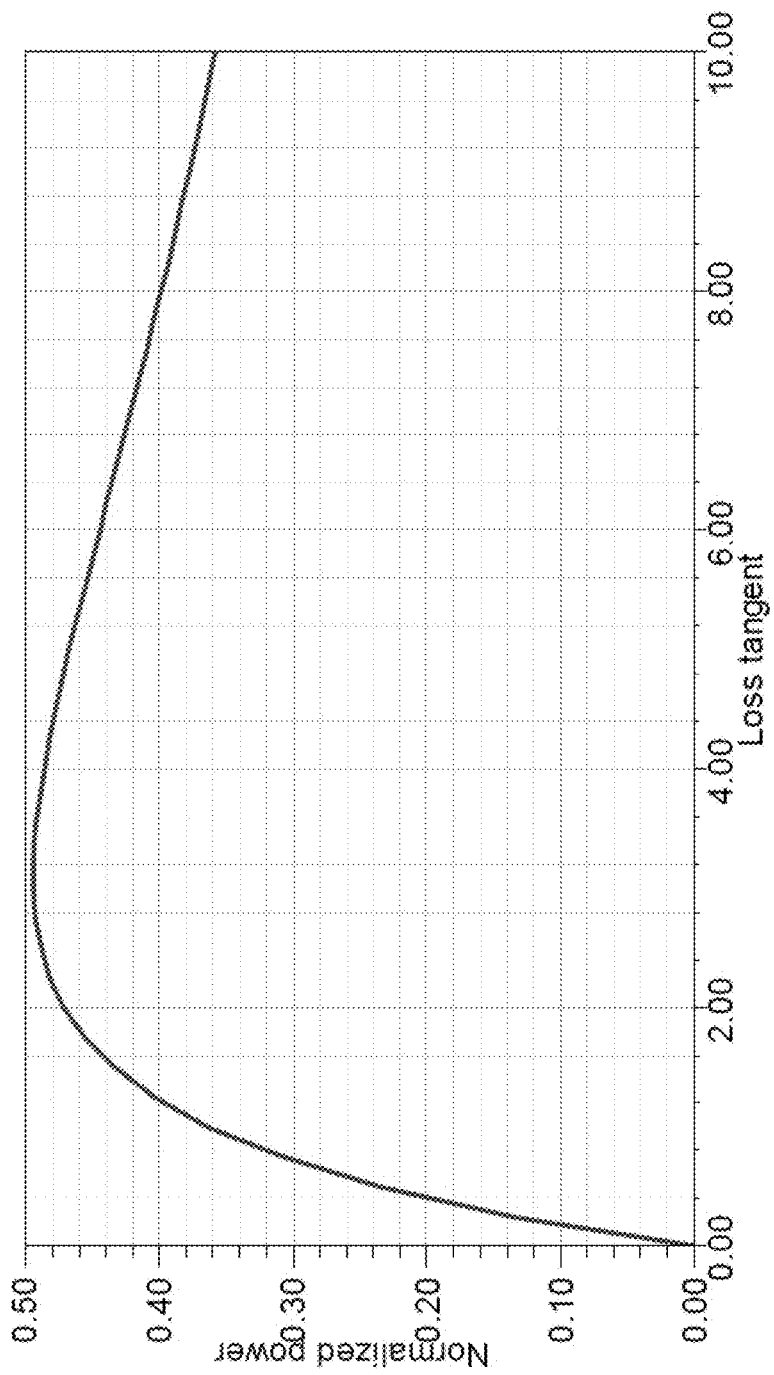
FIG. 26 is a graph showing simulated results of the normalized microwave absorbed power versus the loss tangent for fixed dielectric constant of a simulated lossy dielectric in a rectangular waveguide with a constant dielectric constant.

The relationship between carbon nanotube concentration and total absorbed power was computed for tuning the microwave absorption in the carbon nanotube layer. ANSYS HFSS was used to simulate a slab of a lossy dielectric placed in a rectangular waveguide with a constant dielectric constant. FIG. 26 shows the total normalized microwave power absorbed by the slab versus the material's loss tangent tan δ (the loss tangent is related the material's electrical conductivity tan $\delta = \sigma/(2\pi f\epsilon)$, where σ is the conductivity, ϵ is the dielectric constant, and f is the frequency). As shown in FIG. 24, there is an optimum value for the loss tangent (controlled by the CNT concentration amount) that maximizes the power dissipated in the material (converted to heat). This can be used to identify the parameters for achieving the desired bonding strength in the manufactured components using the CNT/PLA substrates after microwave exposure. Such parameters include CNT concentration, microwave power, frequency, and exposure time.

Figure 27:
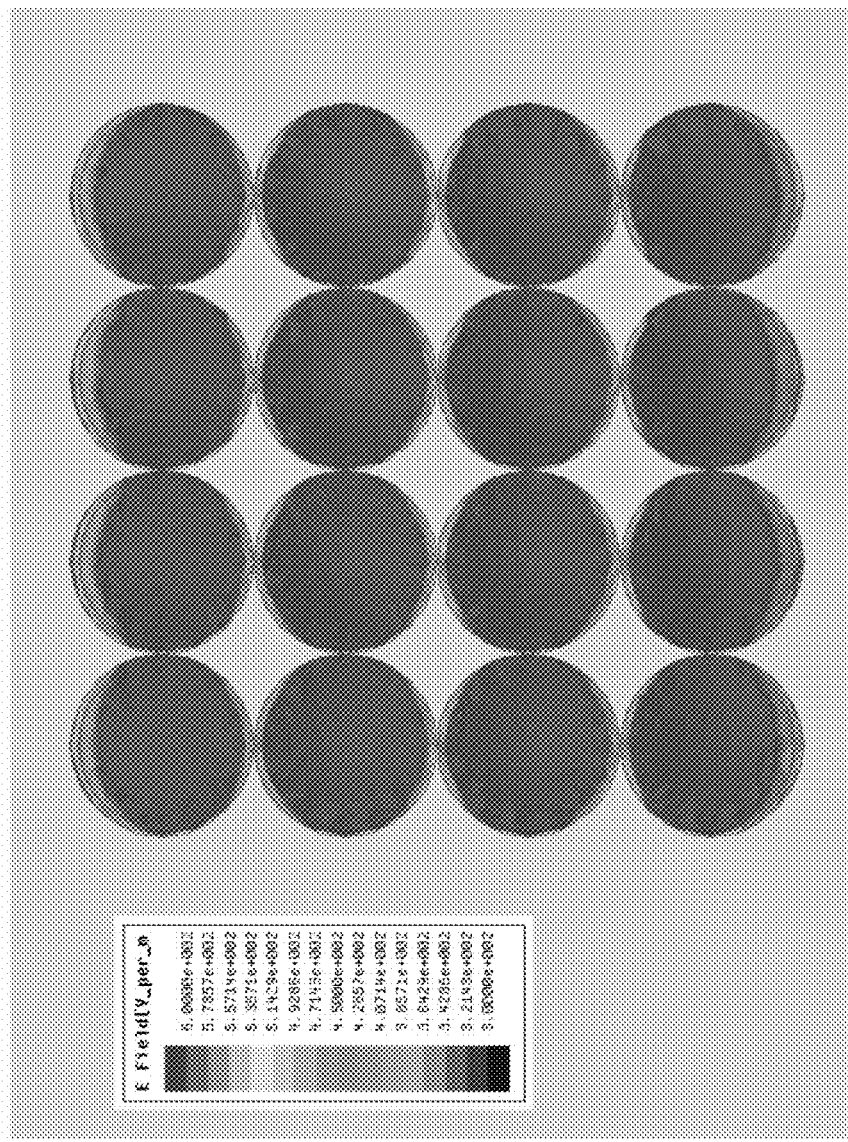
FIG. 27 shows the electric field magnitude in a bundle of PLA filaments coated with a thin conductive shell representing CNTs.

This modeling and simulation also indicated the inhomogeneous heating effects in the nanocomposites. FIG. 27 shows the electric field magnitude in a bundle of PLA filaments coated with a thin conductive shell representing CNTs (shown in FIGS. 16A-16B). The bundle was placed in a rectangular waveguide operating in $TE_{10}$ mode which has a vertically polarized electric field. The amount of heating corresponded to the electric field magnitude. The electric field was stronger in the thin CNT shell region than in the PLA core, resulting in stronger heating of the shell. This indicates that the heating was confined to the shell, allowing for heating and diffusion at the interface rather than the bulk.

Microwave-Induced Polymer Adhesion

The mechanical effects of microwave heating on welds in CNT/polymer nanocomposites were also examined. The CNT-rich polymer coatings enhance polymer substrate adhesion upon exposure to microwave irradiation. In addition to polymer interface mechanics, such phenomena open up new avenues in additive manufacturing by allowing site-specific heating/bonding at the nanoscale.

To examine this, MWCNT/PLA films were applied on two PLA substrates, the two substrates were then adhered, and then exposed the sample to a microwave field. A commercial 1250 W microwave oven for microwave exposure was utilized. Since microwave ovens do not have a uniform electromagnetic field distribution, the sample experienced inhomogeneous heating. However, a microwave exposure chamber can be utilized that provides uniform electromagnetic field distribution to better ensure that the parts of the sample are uniformly heated.

Figure 28:
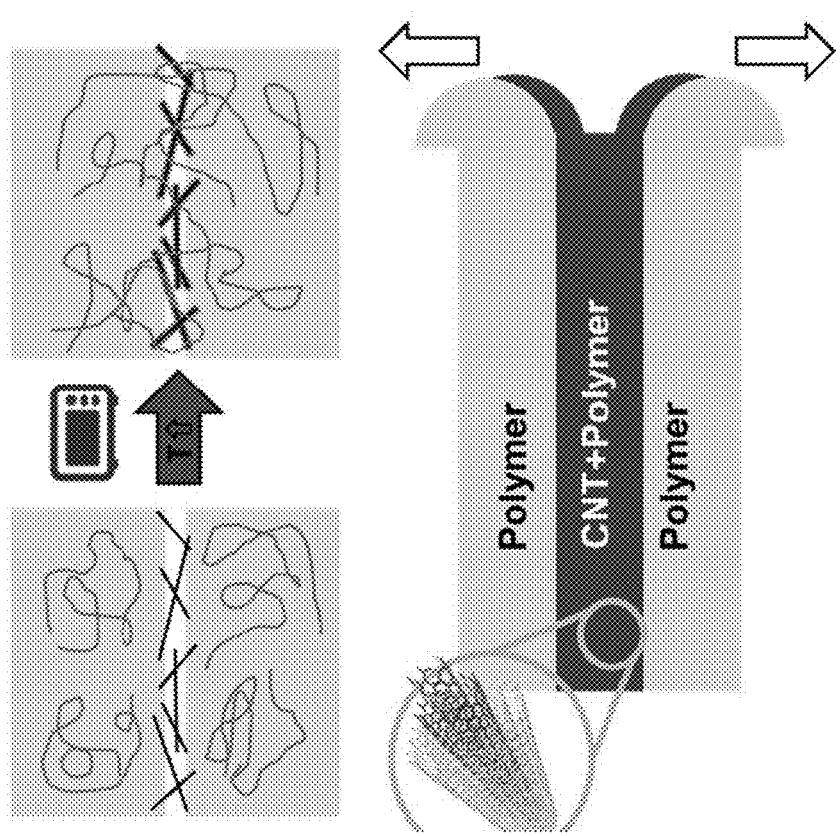
FIG. 28 illustrates a schematic of peel tests for microwave enhanced CNT/polymer film adhesion.

As the multi-walled carbon nanotubes act as local heat sources when exposed to microwaves, polymer diffusion and increased mobility at the interface will allow for seamless weld, forming rapidly without warping the bulk structure. ASTM peel tests (conducted using a conventional tensile tester) as illustrated in FIG. 28 can provide a macroscale indication of the effect of microwave irradiation on the enhanced adhesive strength in the MWCNT/polymer layer. The coating thickness and CNT content can be varied (as well as the microwave exposure) to control the effects of the coating on polymer diffusion. In addition to the non-monotonic microwave response of the CNT film, it is believed that extremely high CNT loadings will inhibit polymer diffusion from the two bulk phases on either side of the interface. Accordingly, the coating thickness and CNT content can be controlled for better polymer diffusion. Hence the degree of chain inter-diffusion and effectiveness of the welding process is tunable and controllable.

Manufacturing Process

The process of coating normal PLA filaments with carbon nanotubes allows that these PLA filaments can be used in existing 3-D printers. The concept of coating filaments with carbon nanotubes for microwave-induced welding is entirely new. The data indicate such coated filaments can be used as a feedstock for 3-D printing a variety of structures. For instance, these CNT-loaded 3-D structures can be formed and then be exposed to microwave irradiation (in the range of 1 W to 1 kW) for a period of time (in the range of 1 second to 5 minutes) such that the CNT-rich polymer coatings will be heated and induce localized melting, interfacial diffusion, and increased adhesive strength. These can be controlled for advanced properties, including those reflected above. The resulting objects can have (by design) enhanced compressive and tensile strength (such as can be measured on an Instron mechanical tester).

The data (reflected above) show that the CNT coating is maintained throughout the extrusion process that occurs during 3-D printing. These structures have similar surface conductivity and microwave responsiveness before and after printing if both CNT and PLA are present in the coating.

Figure 29:
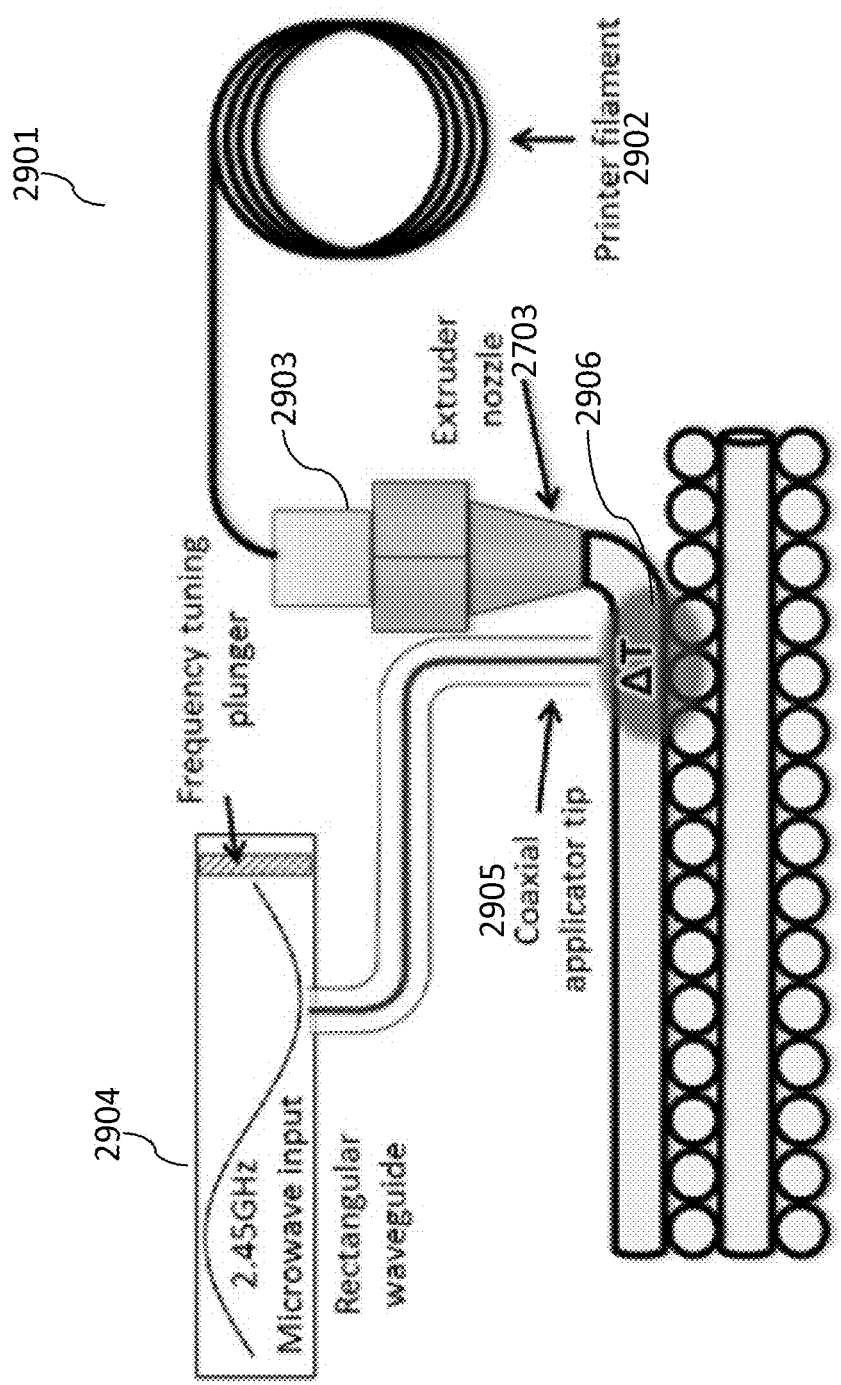
FIG. 29 illustrates a process of an embodiment of the present invention wherein an in-situ microwave applicator applies microwave energy at the point of extrusion to control the localized heating and welding of the polymer.

FIG. 29 illustrates an in-situ microwave magnetron-waveguide-coaxial applicator system 2901 to heat the filament-filament interface at the newly printed location during the printing process itself that can be utilized in an embodiment of the present invention. In system 2901, the printing filament 2902 (such as carbon nanotube coated PLA) is extruded through the extruder nozzle 2903 of the additive manufacturing device (such as a 3D printer, i.e., like the 3D printer produced by Helix). (In FIG. 29 only the extruder nozzle 2903 and the printing filament 2902 of the additive manufacturing device is shown in detail. The remainder of the standard additive manufacturing device, such as the standard parts of a 3D printer are represented by block 2904).

System 2901 also has a microwave source 2904 (such as a rectangular waveguide that has a 2.45 GHz microwave input (controllable with a frequency tuning plunger). The microwave source can be focused upon the newly printed location using a coaxial applicator tip 2905 located at that location. The application of microwaves at the coaxial locator tip provides localized heating (AT) 2906.

Electromagnetic shielding (not shown) can also be incorporated into the system for various reasons, including safety and integrity concerns). This allows the microwave exposure system to be integrated into the 3-D printer hardware with appropriate electromagnetic shielding measures.

The coaxial applicator tip 2905 can be attached to the printer head directly (which is where the extruder nozzle 2903 is located) in order to move with the printer head. This localized microwave heating allows for the microwave power to be applied during printing, with only the immediately-printed area being exposed rather than the entire sample.

This will allow for direct modifications to the printer architecture to allow for microwave exposure immediately after filament deposition.

Such a system will yield (a) a novel system and process that utilizes microwave radiation response of CNTs and CNT/polymer nanocomposites; (b) efficient modeling techniques suitable for materials with CNT dispersions; (c) processing-structure-property relations for CNT/polymer nanocomposite welds after microwave exposure; (d) development of a 3D printing apparatus incorporating optimized CNT loading and a microwave exposure process.

Manufacturing Technology

Embodiments of the present invention overcome the current disparity between (1) traditionally manufactured polymer parts utilizing injection molding, extrusion molding, machining and (2) parts printed with additive manufacturing techniques such as Fused Deposition Modeling (FDM™, Stratasys, Inc.) and Fused Filament Fabrication (FFF). Such processes (a) increase the overall strength of 3D printed thermoplastic parts, (b) allow for the rapid diffusive bonding of polymer chains between beads (thus increasing strength), without distorting or heating the bulk part, and (c) improve the isotropic mechanical properties of 3D printed thermoplastic parts so that they can rival (or even exceed) their manufactured counterparts.

Embodiments of the present invention can be used and incorporated into industrial and consumer 3D printing processes. Embodiments of the present invention can enhance the manufacturing of parts, such as parts pertaining to the aerospace, automotive, defense, and space industries.

The system and processes of the present invention and the resulting materials produced are important for a range of engineering fields, both fundamental (such as polymer dynamics, microwave physics) and applied (nanocomposite processing). These outcomes dovetail with national manufacturing priority areas including additive manufacturing, vehicle and antenna design, radar-absorbing coatings, and electromagnetic shielding. Defense and aerospace needs in particular have substantial needs that can be met by additive manufacturing if the difficulties with weld mechanical properties are also addressed.

The present invention also has significant impact on other industrial and scientific applications that utilize nanoparticles for electrical property modification. Accurate and efficient nanoparticle dispersions in a host medium to controllably utilize their electrical properties is a challenging problem and is very much needed in multitude of applications.

The examples provided herein are to more fully illustrate some of the embodiments of the present invention. It should be appreciated by those of skill in the art that the techniques disclosed in the examples which follow represent techniques discovered by the Applicant to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

RELATED PATENTS AND PUBLICATIONS

The following patents and publications relate to the present invention:

U.S. Pat. No. 7,754,054, "Microwave Induced Functionalization Of Single Wall Carbon Nanotubes And Composites Prepared Therefrom," issued Jul. 13, 2010, to Mittra et al.

U.S. Pat. No. 8,080,199, "Interaction Of Microwaves With Carbon Nanotubes To Facilitate Modification," issued Dec. 20, 2011, to Tour et al.

U.S. Patent Publication No. 2011/0223343, "Novel Nanocomposite For Sustainability of Infrastructure," published Sep. 15, 2011, to Wang et. al.

Chowdhury, S. R., et al., "Microwave-Induced Rapid Nanocomposite Synthesis Using Dispersed Single-Wall Carbon Nanotubes as the Nuclei," *Journal of Materials Science*, 2009, 44, (5), 1245-1250, doi:10.1007/s10853-009-3259-4.

Higginbotham, A. L., et al., "Carbon Nanotube Composite Curing through Absorption of Microwave Radiation," *Composites Science and Technology*, 2008, 68, (15-16), 3087-3092, doi:10.1016/j.compscitech.2008.07.004.

Irin, F., et al., "Detection of carbon nanotubes in biological samples through microwave-induced heating," *Carbon*, 2012, 50, (12), 4441-4449.

Nikzad, M, et al., "Thermo-Mechanical Properties of a Highly Filled Polymeric Composites for Fused Deposition Modeling," *Materials Design*, 2011, 32, (6), 3448-3456, doi:10.1016/j.matdes.2011.01.056.

Partain, S. C., "Fused Deposition Modeling with Localized Pre-Deposition Heating Using Forced Air," *Vasa*, 2007, http://medcontent.metapress.com/index/A65RM03P4874243N.pdf; Montana State University, 2007, http://scholarworks.montana.edu/xmlui/handle/1/2016.

Paton, Keith R., et al., "Efficient Microwave Energy Absorption by Carbon Nanotubes," *Carbon*, 2008, 46, (14), 1935-1941, doi:10.1016/j.carbon.2008.08.001.

Shim, Hyung Cheoul, et al., "Enhancement of Adhesion Between Carbon Nanotubes and Polymer Substrates Using Microwave Irradiation," *Scripta Materialia*, 2009, 61, (1), 32-35, doi:10.1016/j.scriptamat.2009.02.060.

Shofner, M. L., "Nanofiber-reinforced Polymers Prepared by Fused Deposition Modeling, *Journal of Applied Polymer Science*, 2003, 89, (11), 3081-3090 http://onlinelibrary.wiley.com/doi/10.1002/app.12496/full.

Vegesna, S., et al., "Non-destructive Technique for Broadband Characterization of Carbon Nanotubes at Microwave Frequencies," *Journal of Electromagnetic Waves and Applications*, 2013, 27, (11), 1372-1381.

Wang, C. Y., et al., "Strong Carbon-Nanotube—Polymer Bonding by Microwave Irradiation," *Advanced Functional Materials*, 2007, 17, (12), 1979-1983, doi:10.1002/adfm.200601011.

Wang, C. Y., et al., "Flexible Field Emitter Made of Carbon Nanotubes Microwave Welded onto Polymer Substrates," *Applied Physics Letters*, 2007, 90, (10), 103111, doi: 10.1063/1.2711771.

Wohlers Associates, "Wohlers Report 2012: Additive Manufacturing and 3d Printing, State of the Industry." 2012, 1-271 (Ft. Collins, Co.) http://wohlersassociates.com/state-of-the-industry-reports.html.

Ziemian, C., et al., "Anisotropic Mechanical Properties of ABS Parts Fabricated by Fused Deposition Modelling" *Mechanical Engineering*, 2012, Chapter 7, 159-181 (edited by Gokcek, Murat), doi: 10.5772/34233.

The disclosures of all patents, patent applications, and publications cited herein are hereby incorporated herein by reference in their entirety, to the extent that they provide exemplary, procedural, or other details supplementary to those set forth herein.

What is claimed is:

1. A polymer composite comprising polymer filaments each having an outer layer in which the polymer filaments are arranged such that there are filament-filament interfaces between the outer layers of the polymer filaments, wherein
   (a) the outer layer of each of the polymer filaments comprises an electrically conductive percolated network of an electrically conductive nanomaterial,
   (b) the electrically conductive nanomaterial comprises carbon nanotubes that are mixed with polylactic acid (PLA) in the outer layer,
   (c) the outer layer of each of the polymer filaments has a thickness between 0.005% and 30% of a diameter of the polymer filament, and
   (d) the electrically conductive nanomaterial is heat-able by an electromagnetic field to generate a temperature profile in the polymer filaments that forms a weld at each of the filament-filament interfaces between the outer layers of the polymer filaments.

2. The polymer composite of claim 1, wherein the polymer filament comprises at least one polymer selected from a group consisting of styrene (ABS), polycarbonate (PC), polylactic acid (PLA), polyethylene (PE), polycarbonate(PC)/styrene(ABS), polyphenylsulfone (PPSU), polyamide (nylon), polystyrene (PS), polyetherimide, polyether ether ketone (PEEK), polytetrafluoroethylene (PTFE), and combinations thereof.

3. The polymer composite of claim 1, wherein the carbon nanotubes are multi-walled carbon nanotubes.

4. The polymer composite of claim 1, wherein the outer layer comprises between 1 wt % and 50 wt % of carbon nanotubes.

5. The polymer composite of claim 1, wherein the outer layer has a wt % of carbon nanotubes sufficient to form the electrically conductive percolated network of the electrically conductive material.

6. The polymer composite of claim 1, wherein the polymer filament has a volume and the electrically conductive nanomaterial is present throughout the volume.

7. A polymer composite comprising polymer filaments each having an outer layer in which the polymer filaments are arranged such that there are filament-filament interfaces between the outer layers of the polymer filaments, wherein
   (a) the outer layer of each of the polymer filaments comprises an electrically conductive nanomaterial,
   (b) the electrically conductive nanomaterial comprises carbon nanotubes that are mixed with polylactic acid (PLA) in the outer layer,
   (c) the outer layer of each of the polymer filaments has a thickness between 0.005% and 30% of a diameter of the polymer filament, and
   (d) the electrically conductive nanomaterial is heat-able by an electromagnetic wave, the electrically conductive nanomaterial provided at a concentration sufficient to provide a threshold dielectric loss tangent of the polymer filaments that provides fusing at each of the filament-filament interfaces between the outer layers of the polymer filaments upon the electrically conductive nanomaterial absorbing an electromagnetic wave selected to produce a predetermined temperature profile in the outer layer.

8. The polymer composite of claim 7, wherein the threshold dielectric loss tangent maximizes an electric current induced in the electrically conductive nanomaterial by the electromagnetic wave.

9. The polymer composite of claim 7, wherein the concentration of the electrically conductive nanomaterial is adjusted such that the outer layer exhibits a desired bond strength at the interface.

10. The polymer composite of claim 7, wherein the outer layer comprises polymer chains that inter-diffuse across the interface upon fusing.

11. The polymer composite of claim 7, wherein the polymer filament comprises at least one polymer selected from a group consisting of styrene (ABS), polycarbonate (PC), polylactic acid (PLA), polyethylene (PE), polycarbonate(PC)/styrene(ABS), polyphenylsulfone (PPSU), polyamide (nylon), polystyrene (PS), polyetherimide, polyether ether ketone (PEEK), polytetrafluoroethylene (PTFE), and combinations thereof.

12. The polymer composite of claim 7, wherein the outer layer has a wt % of carbon nanotubes sufficient to form an electrically conductive percolated network of the electrically conductive material.

13. The polymer composite of claim 7, wherein the polymer filament has a volume and the electrically conductive nanomaterial is present throughout the volume.

14. A three-dimensional object comprising a plurality of polymer filaments arranged in successive layers, wherein
   (a) the polymer filaments each comprise a coating comprising an electrically conductive percolated network of an electrically conductive nanomaterial,
   (b) the electrically conductive nanomaterial comprises carbon nanotubes that are mixed with polylactic acid (PLA) in the coating,
   (c) the coating of each of the polymer filaments is an outer layer which has a thickness between 0.005% and 30% of a diameter of the polymer filament, and
   (d) the electrically conductive material is heat-able by an electromagnetic wave to generate a temperature profile in the polymer filament that fuses the coating of the polymer filaments together at a filament-filament interface between the outer layers of the polymer filaments in each of the successive layers.

15. The three-dimensional object of claim 14, wherein the polymer filaments comprise at least one polymer selected from a group consisting of styrene (ABS), polycarbonate (PC), polylactic acid (PLA), polyethylene (PE), polycarbonate(PC)/styrene(ABS), polyphenylsulfone (PPSU), polyamide (nylon), polystyrene (PS), polyetherimide, polyether ether ketone (PEEK), polytetrafluoroethylene (PTFE), and combinations thereof.

16. The three-dimensional object of claim 14, wherein the outer layer has a wt % of carbon nanotubes sufficient to form the electrically conductive percolated network of the electrically conductive material.

17. The three-dimensional object of claim 14, wherein the polymer filament has a volume and the electrically conductive nanomaterial is present throughout the volume.

* * * * *